(12) United States Patent
Eggert et al.

(10) Patent No.: US 6,443,735 B1
(45) Date of Patent: Sep. 3, 2002

(54) COMPUTERIZED EDUCATION SYSTEM FOR TEACHING PATIENT CARE

(75) Inventors: John S. Eggert, Miami, FL (US); Michael S. Eggert, Birmingham, AL (US); Phillip Vallejo, Miami, FL (US)

(73) Assignee: Gaumard Scientific, Inc., Miami, FL (US)

( * ) Notice: Subject to any disclaimer, the term of this patent is extended or adjusted under 35 U.S.C. 154(b) by 0 days.

(21) Appl. No.: 09/560,949

(22) Filed: Apr. 28, 2000

Related U.S. Application Data

(63) Continuation-in-part of application No. 09/199,599, filed on Nov. 25, 1998, now Pat. No. 6,193,519, which is a continuation of application No. 08/643,435, filed on May 8, 1996, now Pat. No. 5,853,292.

(51) Int. Cl.[7] .............................................. G09B 23/28
(52) U.S. Cl. ........................ 434/262; 434/266; 434/267; 434/268; 434/272
(58) Field of Search ................................ 434/262, 265, 434/266, 267, 268, 272, 327

(56) References Cited

U.S. PATENT DOCUMENTS

| | | |
|---|---|---|
| 3,797,130 A | 3/1974 | Knapp et al. |
| 3,822,486 A | 7/1974 | Knapp et al. |
| 3,824,709 A | 7/1974 | Knapp et al. |
| 3,826,019 A | 7/1974 | Knapp et al. |
| 4,907,973 A | 3/1990 | Hon |
| 5,509,810 A | 4/1996 | Schertz et al. |
| 5,769,640 A | 6/1998 | Jacobus et al. |
| 5,853,292 A | 12/1998 | Eggert et al. |
| 5,882,206 A | 3/1999 | Gillio |
| 6,193,519 B1 | 2/2001 | Eggert et al. |
| 6,220,866 B1 * | 4/2001 | Amend et al. .............. 434/266 |

* cited by examiner

*Primary Examiner*—John Edmund Rovnak
(74) *Attorney, Agent, or Firm*—Haynes and Boone, LLP

(57) ABSTRACT

A computerized education system with a physiological simulator for interactively teaching patient care to a user is described. The system comprises a computer program for displaying a selection of selectable modules for providing different interactive training sessions, and a virtual stethoscope for use with the simulator in performing patient care, and cooperating with corresponding sensors on the simulator, thus providing feedback to confirm proper use of the virtual stethoscope on the simulator. The system also comprises an interface module for interfacing the sensors with the computer program, the module comprising a processor for receiving signals from the sensors and converting the signals to provide feedback.

16 Claims, 20 Drawing Sheets

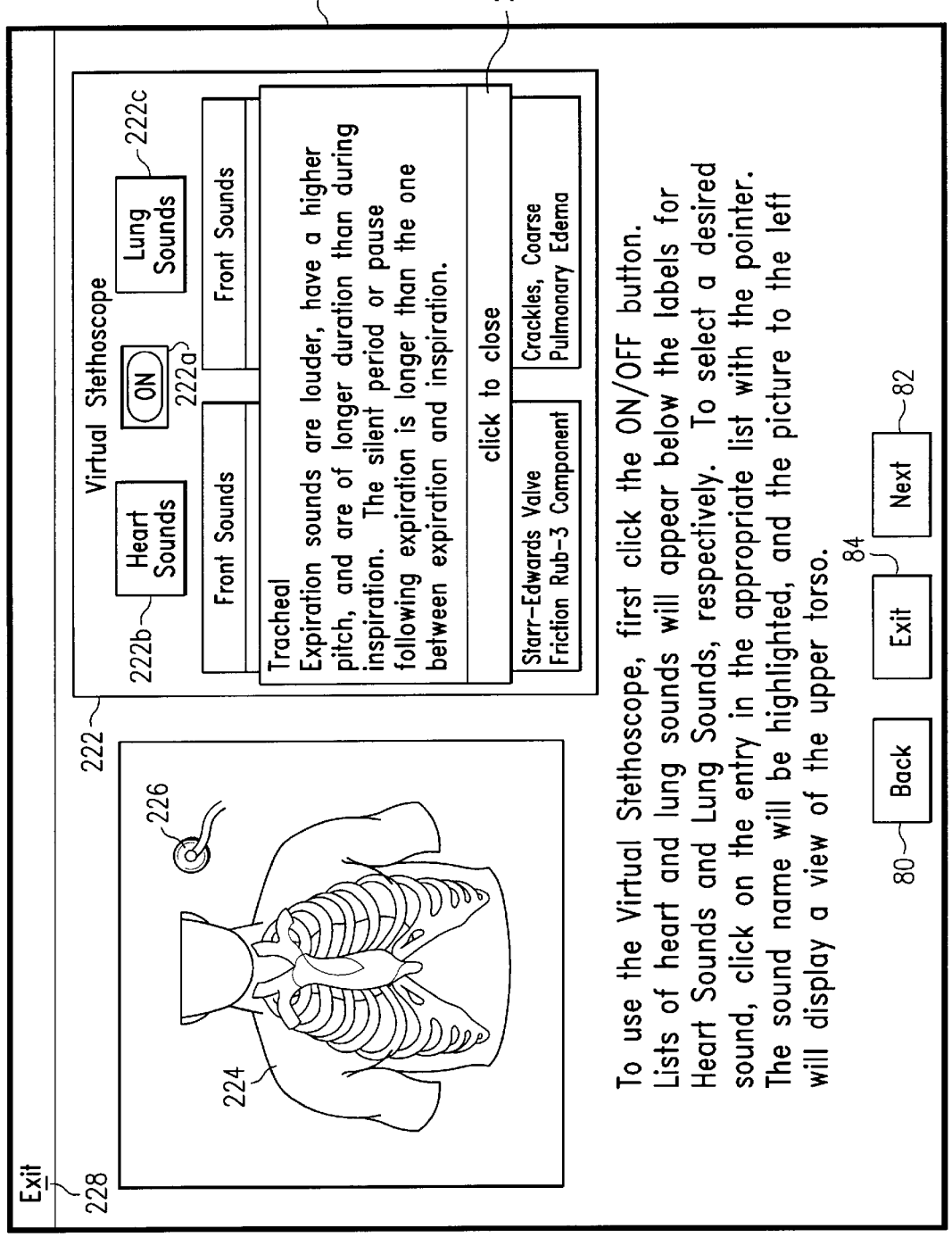

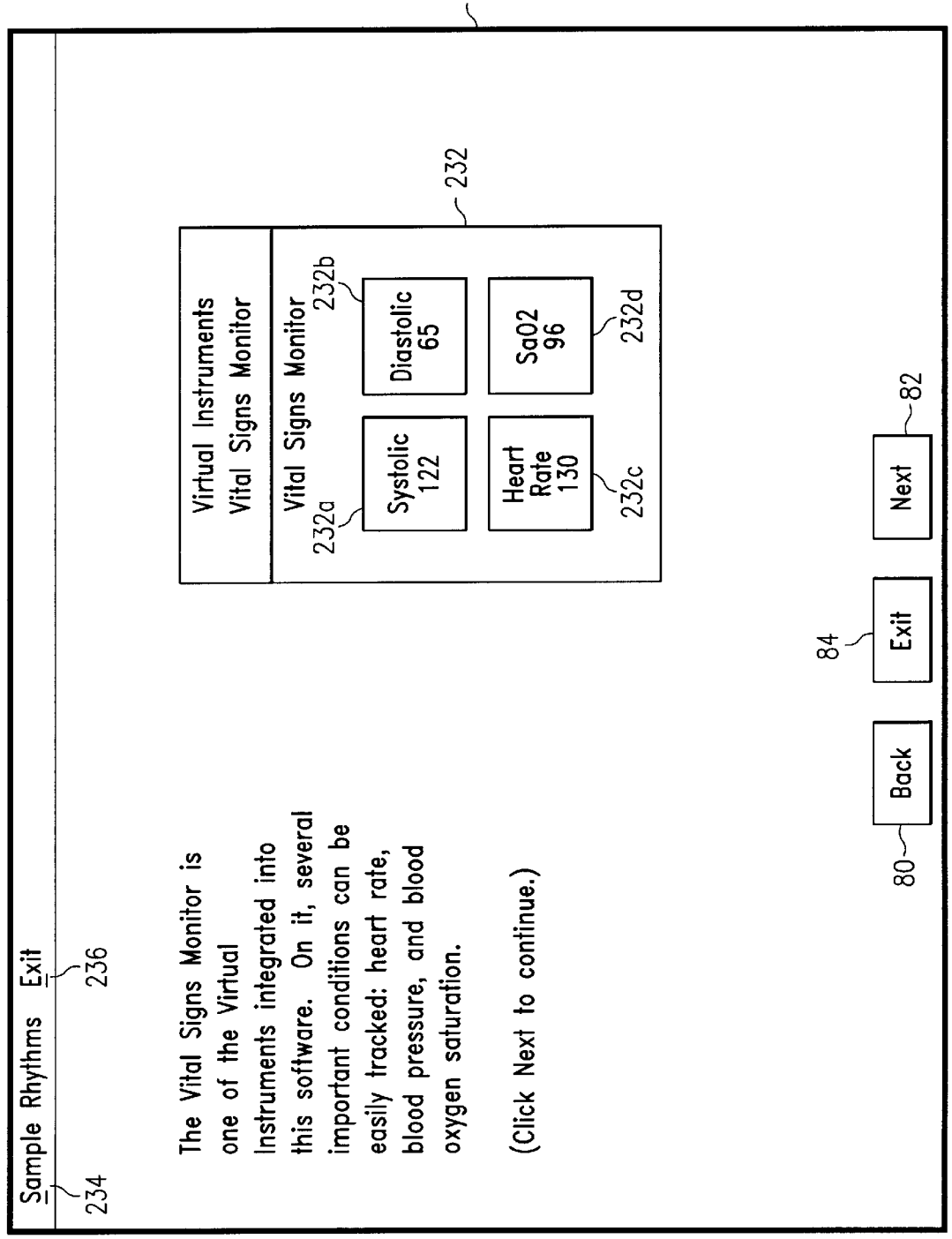

Fig. 20

Sample Rhythms  EKG Sounds  Exit
244              246         248

Virtual Instrument Electrocardiograph
242

242a (EKG graph)

76    ON
242b  242c

240

The Virtual EKG Monitor is
one of the Virtual Instruments
integrated into this software.
It is used to display the
activity of the heart's
conduction system. The
display is updated with a
sweep, cycling from left to
right. To use the EKG
monitor, click the ON/OFF
button, and the sweep will
activate.

(Click Next to continue.)

Back    Exit    Next
80      84      82

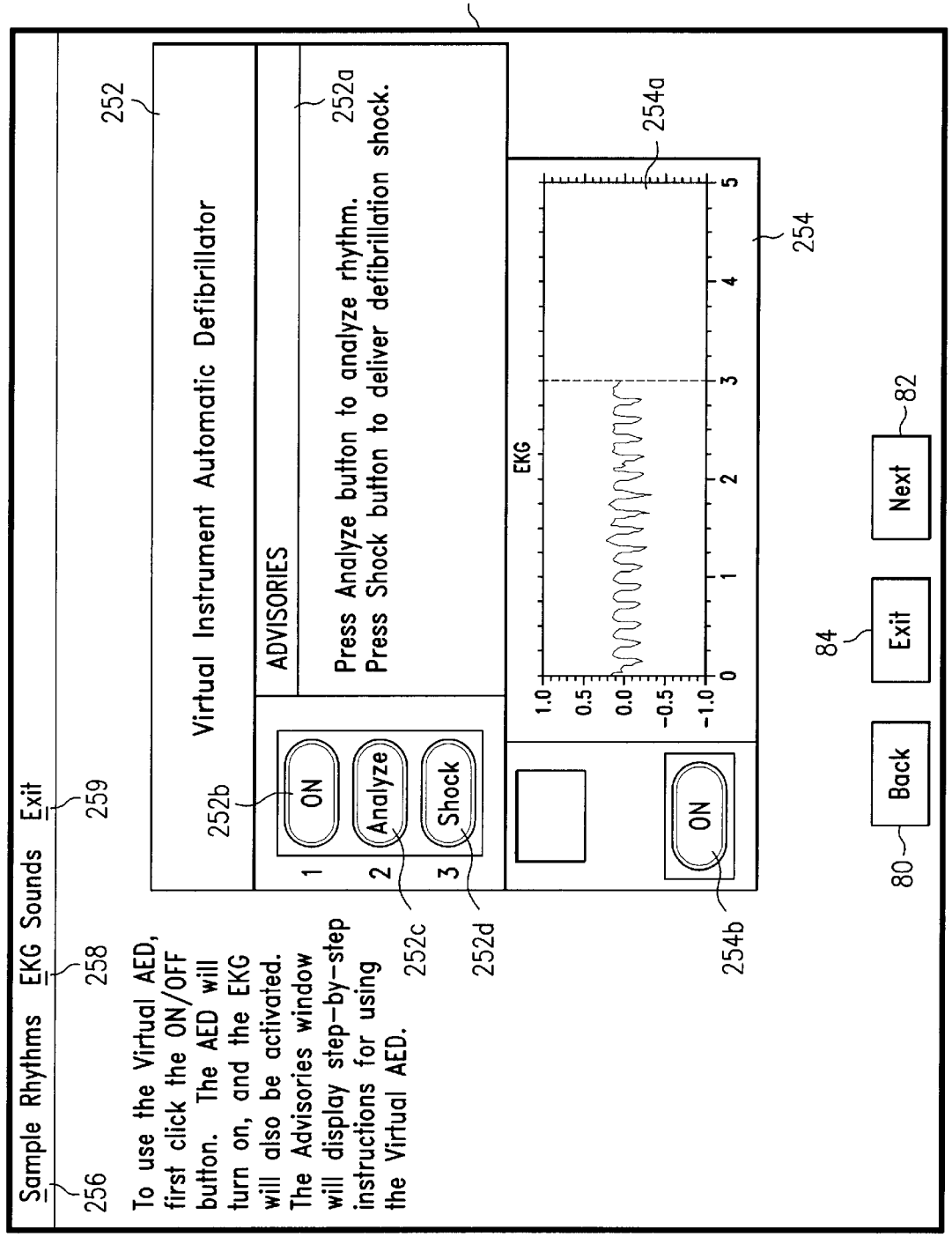

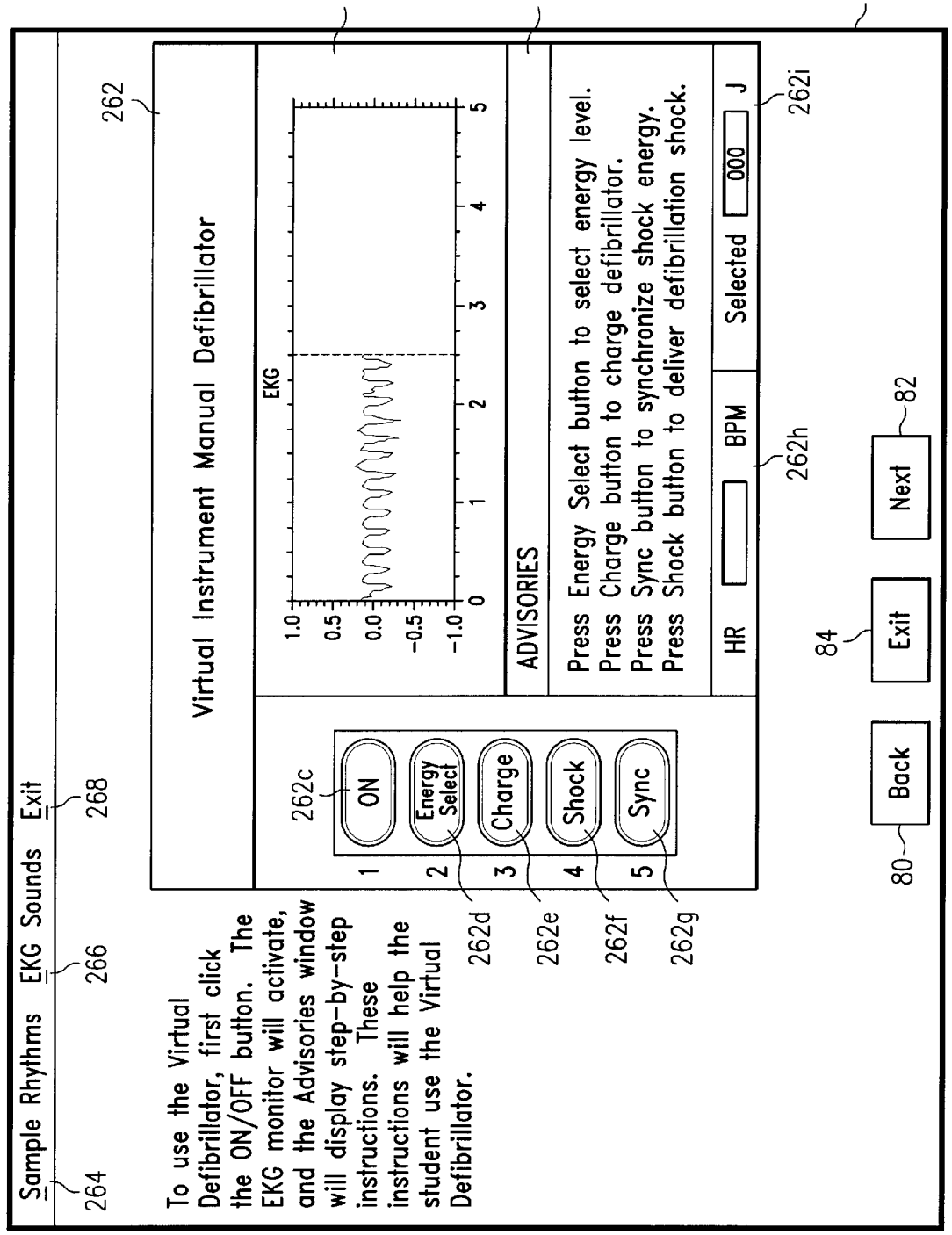

COMPUTERIZED EDUCATION SYSTEM FOR TEACHING PATIENT CARE

CROSS-REFERENCE TO RELATED APPLICATION

This application is a continuation-in-part of U.S. Ser. No. 09/199,599, now U.S. Pat. No. 6,193,519, filed Nov. 25, 1998, which is a continuation of U.S. Ser. No. 08/643,435, now U.S. Pat. No. 5,853,292, filed May 8,1996.

BACKGROUND

The present embodiment relates generally to an interactive, computerized education system for teaching patient care, and more particularly to such a system for use in conducting patient care training sessions using virtual instruments in cooperation with a manikin, or patient simulator.

While providing a low-cost source for learning theory, textbooks and flash cards lack the important benefit to students that they can get from "hands-on" training and practice. Thus, some patient care training has been taught using training devices, including a training manikin configured to simulate a human patient. In some instances, the training devices allow students to use instruments to assess the manikin's vital signs and to take further action, such as perform CPR.

However, one disadvantage of prior systems is that large capital outlays must be made for the required equipment, especially for the medical instruments used to respond to an emergency, or Code, situation. Consequently, the use of these prior systems and associated instruments is prohibitively expensive, and as a result, many users must settle for less realistic training methods. For example, many manikin systems do not contain a broad variety of instruments to save expense. Some systems even fail to supply instruments commonly used in Code situations.

Therefore, what is needed is a system for an interactive, computerized education system for use in conducting patient care training sessions using relatively inexpensive virtual instruments in cooperation with simulated patient treatment, thereby enabling a user to learn comprehensive multiple and interrelated patient care skills.

SUMMARY

The present embodiment, accordingly, provides a computerized education system with a physiological simulator for interactively teaching patient care to a user. The system comprises a computer program for displaying a selection of selectable modules for providing different interactive training sessions, and a virtual stethoscope for use with the simulator in performing patient care, and cooperating with corresponding sensors on the simulator, thus providing feedback to confirm proper use of the virtual stethoscope on the simulator. The system also comprises an interface module for interfacing the sensors with the computer program, the module comprising a processor for receiving signals from the sensors and converting the signals to provide feedback.

One advantage of the present embodiment is that it provides an interactive, computerized education system for use in conducting patient care training sessions using relatively inexpensive virtual instruments in cooperation with a realistic simulated patient.

BRIEF DESCRIPTION OF THE DRAWINGS

FIGS. 18–23 are views of screen displays generated by the program relating to a group of virtual instruments of the present system.

DETAILED DESCRIPTION

Figure 1:
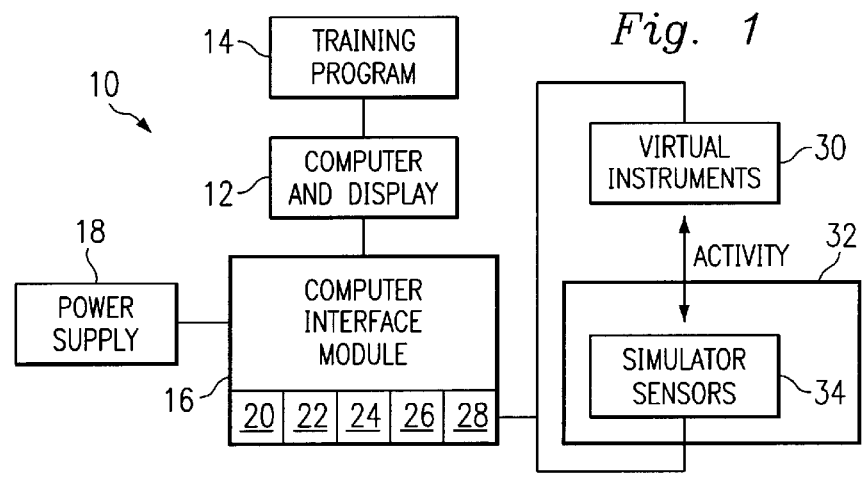
FIG. 1 is a schematic view of a computerized education system according to the present embodiment.

In FIG. 1, the reference numeral 10 refers, in general, to a computerized education system of the present embodiment for teaching patient care protocols to a user. The system 10 includes a computer 12 for operation with a training program 14 having selectable patient care protocols, or modules (not illustrated). Each module represents an interactive patient care training session for the user, as described herein and in U.S. Pat. No. 5,853,292, the entire disclosure of which is hereby incorporated by reference.

A computer interface module ("CIM") 16 is connected to the computer 12. The CIM 16 receives operating power from a conventional power source 18, and contains a processor circuit 20. The CIM 16 additionally includes an audio chip 22 which is responsive to the processor circuit 20 for causing a speaker 24 to produce realistic patient sounds, for example, heart, lung, intestinal, and the like. A rheostat control 26 is included in the CIM 16 for adjusting the volume of the speaker 24. Alternatively, the program 14, or another portion of the system 10, may supply the sounds.

The CIM 16 has a plurality of ports, collectively 28, for receiving a plurality of connectors, as will be explained. The CIM 16 is connected to simulated medical instruments (virtual instruments) 30, which look, feel, and operate like real medical devices, but are designed to interact with the program 14 and a patient simulator device 32 having sensors 34. The sensors 34 are also connected to the CIM 16. It is understood that there may be more than one CIM 16 to manage the required connections. As will be explained, when the user brings the virtual instruments 30 within a predetermined proximity of the sensors 34 of the simulator 32, the activity is sensed, and thereafter reported to the program 14, via the CIM 16. The program 14 compares the information pertaining to the user's activity with predetermined standards, and thus provides an interactive training session.

It is understood that the simulator 32 is designed to represent a patient and receive treatment, and as such, the simulator 32 could take a variety of forms, including a fully articulating and adult-sized simulator, or a newborn baby, a child, or a youth, as well as a portion of simulated patient, for example, the arm, head, or pelvic region. In the present embodiment (not depicted), the simulator 32 has a head, eyes, a nose, and a mouth. The head assembly contains a realistic airway capable of accepting conventional airway adjuncts. A sensor 34 may be disposed in the airway for determining whether an airway adjunct has been placed, or whether a fluid has passed. The airway configuration can be adjusted to display a large tongue, an obstructed pharynx, or closed vocal cords.

The head of the simulator 32 is connected to a torso containing simulated heart, lungs, and other organs. Palpable pulses may be found at carotid, brachial, radial, femoral, and pedis dorsis locations in response to the initial condition of the simulated patient and upon therapeutic interventions, for example, specific pulse locations may become non-palpable as the systolic pressure falls. Heart sounds are heard at appropriate locations through the use of a virtual instrument 30, as will be described. The simulator 32 may display a combination of ventilation means, and lung and airway sounds are heard at appropriate locations through the use of a virtual instrument 30, as will be described. Normal gas exchange lung dynamics are virtual and are controlled by the program 14, which may also determine tidal volumes (TV) and functional residual capacity (FRC). The hands, feet, face, and upper torso change color based upon proper oxygenation or an oxygen deficit. As oxygenation decreases, the extremities change color first, followed by the face and upper torso. Such change is reversible as oxygenation is improved. This is simulated by having applied a conventional photochrome to the simulator, such that upon exposure to an associated adjustable UV light, the simulator appears to turn blue. The intensity of the UV light may be controlled by the program 14.

The heart and lungs are connected to pressure transducers confirming airway ventilation and cardiac compression. For example, an air line may be mounted in tracheal wall of the simulator 32 and connected to a sensor 34 connected to the CIM 16, so that when cardiopulmonary resuscitation (CPR) ventilation is performed on the simulator, the CIM 16 monitors the timing and magnitude of the pressure and volume of the ventilation procedure, via the air line and the sensor. Similarly, a compression bladder may be embedded within the chest cavity of the simulator 32 for sensing and confirming proper timing and magnitude of a CPR chest compression procedure, when connected by an air line to a compression sensor 34 attached to the CIM 16. At least one arm of the simulator 32 contains an IV receptacle capable of accepting medications, and sensors 34 are placed within the receptacle to ascertain whether an IV has been started. The lower torso contains an interchangeable male/female genitourinary system which provides a means for catheterization.

Figure 2:
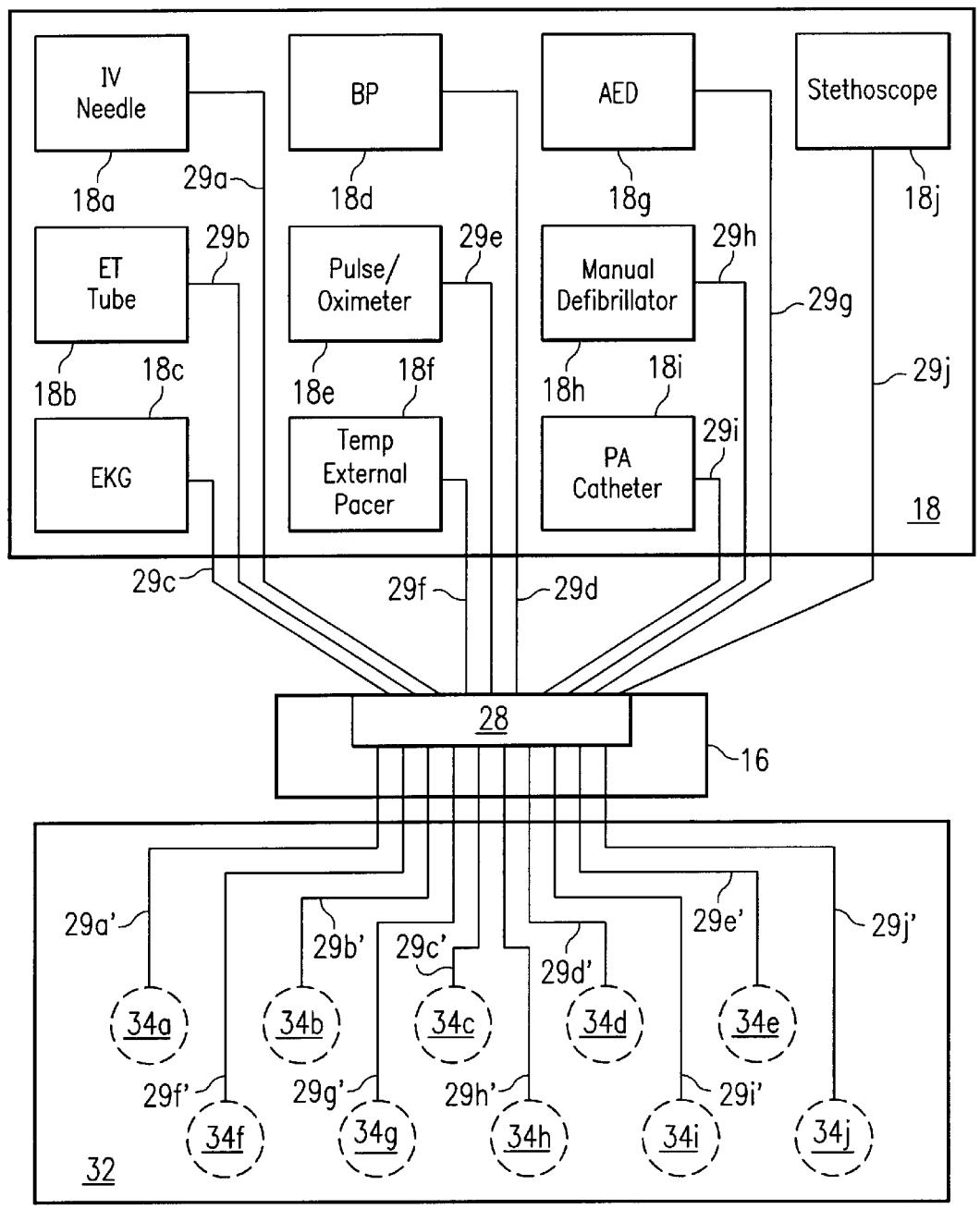
FIG. 2 is a schematic view of the interaction between the virtual instruments and a simulator of the present system.

Referring to FIG. 2, the virtual instruments 30 include at least one IV needle, an ET tube, an EKG monitor, a BP cuff, a pulse oximeter cuff, a temporary external pacer, an AED, a manual defibrillator, a PA catheter, and a virtual stethoscope, 30a–j, respectively. As shown, the virtual instruments 30a–j may be connected to the port 28 of the CIM 16 via lines 36a–j, respectively. As will be discussed in greater detail below, each virtual instrument 30a–j has at least one corresponding sensor, respectively 34a–j, disposed on the simulator 32. The sensors 34a–j may be connected the port 28 of the CIM 16 via lines 36a'–j', respectively, for reasons to be described.

It is understood that the lines, collectively 36, are shown schematically, and merely represent a functional relationship for reporting activity between the virtual instruments 30 and the sensors 34. In some cases, the reporting of activity will be accomplished via a virtual instrument 30 with two nodes and a sensor 34 formed of conductive material, or vice versa, only one of which may be physically connected to the CIM 16 via an electrical lead. Likewise, the embodiment encompasses a virtual instrument 30 with one node and a sensor 34 with another node, both of which may be physically connected to the CIM 16. Similarly, the activity may be reported via means using optical, air pressure, tactile, temperature controlled, or wireless technology. Furthermore, although depicted as having individual lines, it is understood that the embodiment encompasses the sharing of lines among instruments 30, or sensors 34, as well.

The IV needle 30a has a selectable group of specific drugs and dosages provided by the program 14, and in one embodiment is part of a medication tray with an assortment of labeled syringes for dispensing the drugs to the simulator 32, with the effects of administration controlled by the program 14. In operation, the IV needle 30a may be used to confirm venous cannulation, for example, the antecubital region of an arm of the simulator 32 may have a sensor 34a comprising an insulator sandwiched between two layers of conductive material having an appropriate thickness and weave density for permitting the needle 30a to pass through the cloth at a low acute angle (e.g., 20°). The conductive layers of the sensor 34a are electrically coupled to the CIM 16 via line 36a', such that when the needle 30a is correctly passed through the two conductive layers, simulating cannulation of a vein of the simulator 32, a circuit is completed between the layers and sensed by the CIM 16.

The ET tube 30b is used in simulated patient airway management, and in order to confirm proper placement in the tracheal airway of the simulator 32, an optical sensor 34b is mounted in the wall of the trachea of the simulator 32 and connected to the CIM 16 via line 36b'. Correct placement of the ET tube 30b in the trachea is confirmed when the tip of the ET tube interrupts the beam of the optical sensor 34b.

The EKG monitor 30c comprises a multi-lead system, including a real-time trace monitor and R-wave sonic markers, and a line 36c that connects to the CIM 16 at one end, and has a plurality of color-coded patches at the opposite end for attachment to a plurality of sensors, collectively 34c, mounted on the correct regions of the torso of the simulator 32 to confirm proper placement, as sensed by the CIM 16.

The BP cuff 30d attaches to the simulator 32, for example around an arm, and includes a line 36d that attaches to the CIM 16. The cuff 30d includes means 34d for sensing proper positioning of the cuff 30d on the simulator 32, the means being attached to the CIM 16 via line 36d'.

The pulse oximeter finger cuff 30e attaches to the simulator 32, for example around a finger, and includes a line 36e that attaches to the CIM 16. The cuff 30e includes means 34e for sensing proper positioning of the cuff 30e on the simulator 32, the means being attached to the CIM 16 via line 36e'.

The temporary external pacer 30f contains a line 36f that connects to the CIM 16 at one end, and has a plurality of anterior and posterior pacer pads at the opposite end for attachment to a plurality of sensors, collectively 34f, mounted on the correct regions of the torso of the simulator 32. In this manner, the CIM 16 confirms proper placement of the temporary external pacer 30f on the simulator 32. The pacer 30f has means for controlling pacer rate and current, as well as exhibiting rhythm pacing, which is controlled by the program 14.

The automatic external defibrillator (AED) 30g contains a line 36g that connects to the CIM 16 at one end, and has a plurality of apex and sternum AED pads at the opposite end for attachment to a plurality of sensors, collectively 34g, mounted on the correct regions of the torso of the simulator 32, confirming via the CIM 16 that the AED 30g is properly placed on the simulator. Upon selecting a software generated shock button, the system 10 simulates defibrillation shock, with the resultant conditions controlled by the program 14.

The manual defibrillator 30h contains a line 36h that connects to the CIM 16 at one end, and has a plurality of apex and sternum defibrillator paddles at the opposite end for attachment to a plurality of sensors, collectively 34h, mounted on the correct regions of the torso of the simulator 32, confirming via the CIM 16 that the manual defibrillator 30h is properly placed on the simulator. Upon selecting a software-generated shock button, or alternatively, by using dual shock buttons associated with manual defibrillator 30h, the system 10 simulates defibrillation shock, with the resultant conditions controlled by the program 14.

Figure 3:
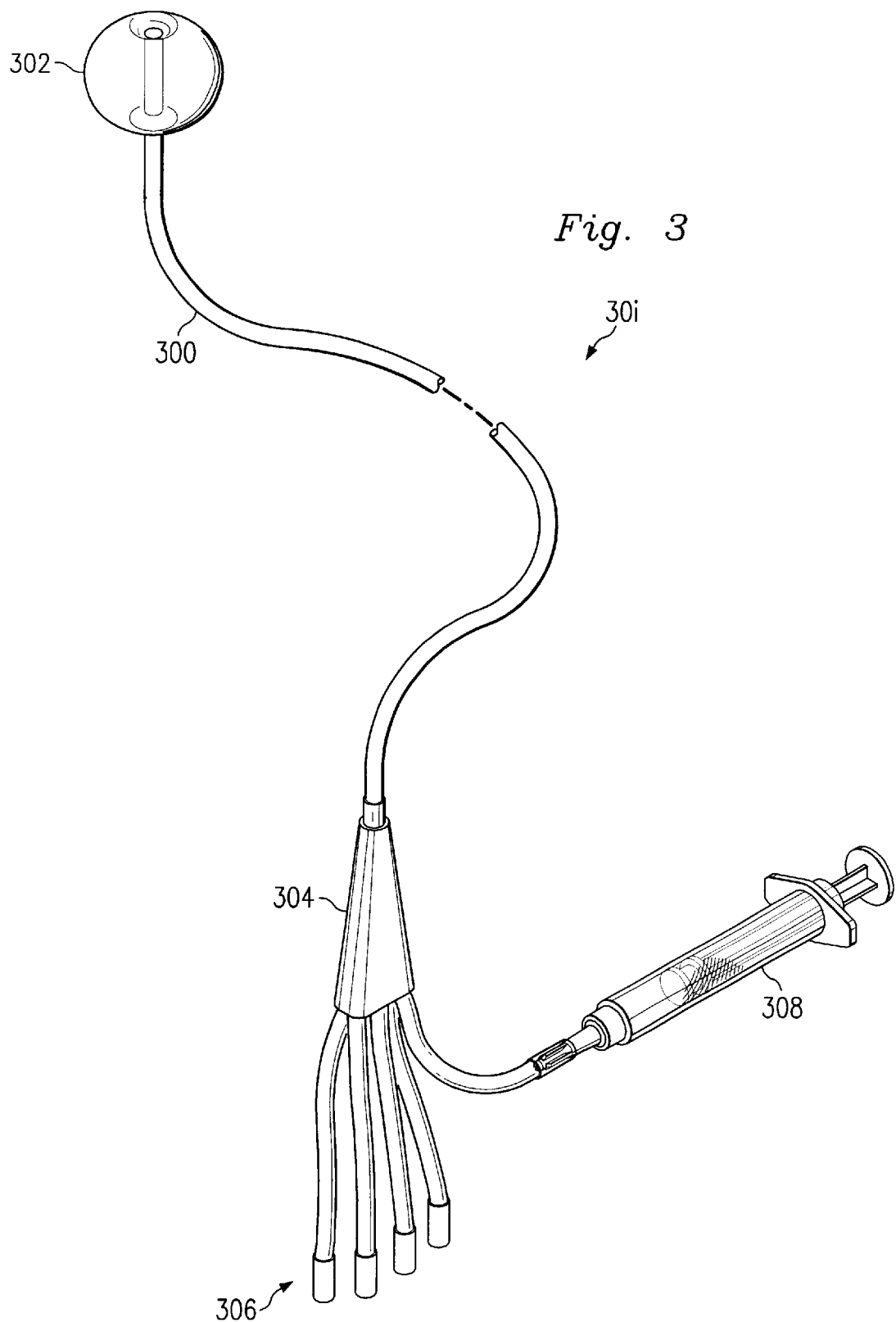
FIG. 3 is a perspective view of a virtual instrument of the present system.

Referring to FIGS. 2 and 3, the PA catheter 30i is a medically accurate insertable catheter for use in vein sites (not depicted) of the simulator 32. The PA catheter 30i comprises a long tube 300, with an inflatable balloon 302 at one distal end. The opposite end of the tube 300 contains a divider 304, having a plurality of connectors 306, at least one connector being connected to a syringe 308. Proper placement of the balloon 302 is determined by sensors 34i placed in the simulator 32, and catheter data comprising important hemodynamic indices such as PA occlusion pressure, cardiac output, and mixed venous oxygen saturation are created by the program 14.

Figure 4:
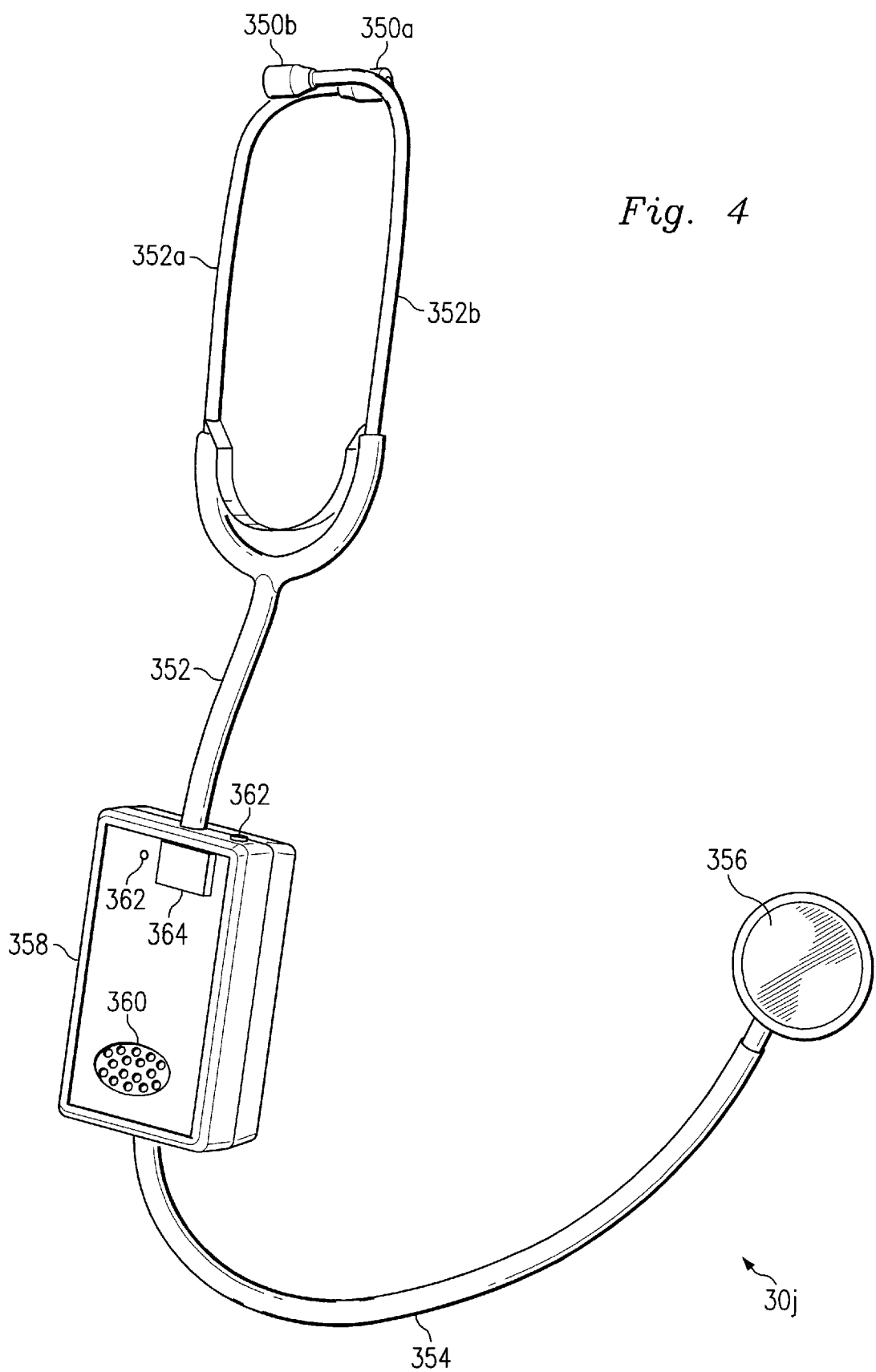
FIG. 4 is a perspective view of another virtual instrument of the present system.

Referring to FIGS. 2 and 4, the stethoscope 30j is moved from location to location on the simulator 32 to hear sounds that would be heard in a real patient. A portion of the stethoscope 30j resembles a standard stethoscope, having earpieces 350a–b, ear tubes 352a–b, a bell tube 354, and a bell 356. However, unlike a standard stethoscope, the stethoscope 30j has an RF acquisition coil, or receiver disposed in the interior of the bell 356.

Correspondingly, the simulator 32 has a number of sensors, collectively 34j, disposed beneath the simulator's skin (not depicted) at anatomical locations where specific heart lung or other sounds are normally heard. Each sensor 34j comprises a small coil, or transmitter, and circuitry which is potted to prevent damage, and to obscure the transmitter from the user's view to avoid visual detection. The transmitter broadcasts a unique signal that serves to identify the particular sensor 34j. The strength to noise (S/N) ratio of the signal determines the proximity to the transmitter wherein the signal may be detected by the acquisition coil of the stethoscope 30j. Thus, control of the S/N ratio allows the sensor 34j to be pinpointed to exact locations on the simulator 32. The transmitter may broadcast continually, or alternatively may be activated when interrogated by the acquisition coil in the bell 356 of the stethoscope 30j, such as when the acquisition coil is brought within a predetermined proximity of the sensor 34j.

As noted above, each sensor 34j emits a unique train of frequencies which are received by the acquisition coil. The acquisition coil transfers the signal to an electronic box 358 disposed on the stethoscope 30j. The electronic box 358 contains a small battery and circuitry for reading the signals acquired by the acquisition coil of the bell 356, determining the identity of the transmitting sensor. The box 358 contains a chip for producing sounds, and plays a predetermined sound appropriate for the anatomical location of the identified sensor 34j, for as long as the bell 356 is within the predetermined proximity of the sensor. A small speaker 360 is disposed in the box 358 for allowing the user to hear the sounds in the earpieces 350a–b, and a jack 362 is provided for output to an external speaker (not depicted). A switch 364 is disposed on the box 358 for switching between playing normal and abnormal sounds.

The stethoscope 30j is a vast improvement on prior art systems for several reasons; first, the predetermined body sounds can be pinpointed to exact locations on the simulator 32 by selecting the proximity (via the S/N ratio) required between the acquisition coil and the sensor 34j. Second, only the selected body sound is heard by the user, unlike systems using speakers disposed in the simulator, which have a tendency to reverberate throughout the simulator. Alternatively, the S/N ratio for signals from two sensors (and corresponding sounds) could be adjusted to overlap, allowing the sound to get clearer as the user moved the bell 356 closer to one sensor and away from the other sensor.

Figure 5:
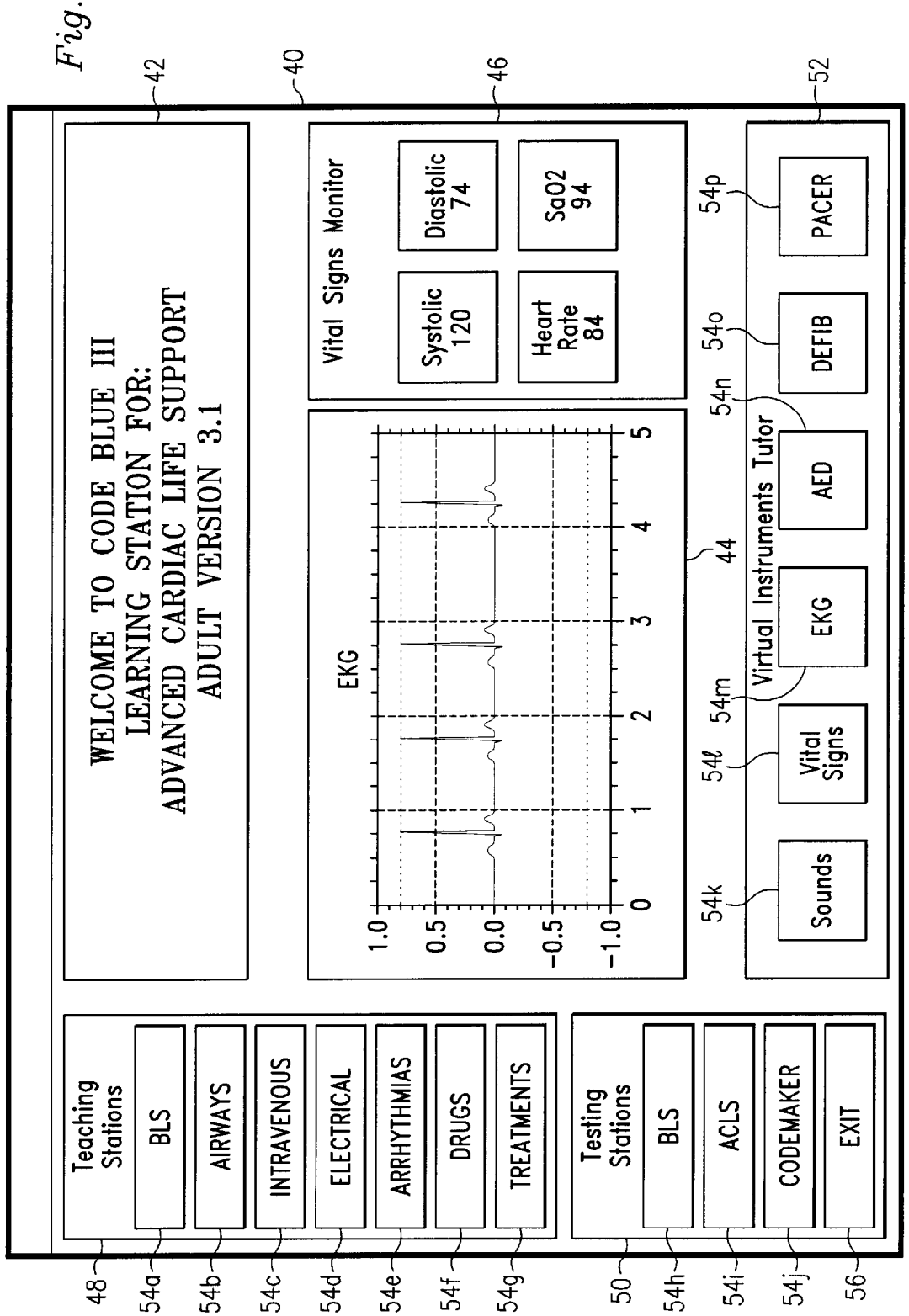
FIGS. 5–7 are views of screen displays generated by a program comprising part of the present system.

Referring now to FIG. 5, an introductory screen display 40 of the program 14 is presented on the computer 12. The display 40 includes several decorative features: a title box 42, an EKG box 44, and a vital signs box 46. The display 40 also contains a teaching box 48, a testing box 50, and a virtual instruments box 52.

The screen 40 also displays a group of selectable patient care modules 54a–54p provided by the program 14, which furnish an interactive training session for the user, dispensing information based on BLS and ACLS guidelines set forth by the American Heart Association, and associated topics. The modules 54a–g are disposed in the teaching box 48, the modules 54h–j and an exit box 56 for exiting the program 14, are disposed in the testing box 50, and the modules 54k–p are disposed in the virtual instruments tutor box 52.

Figure 6:
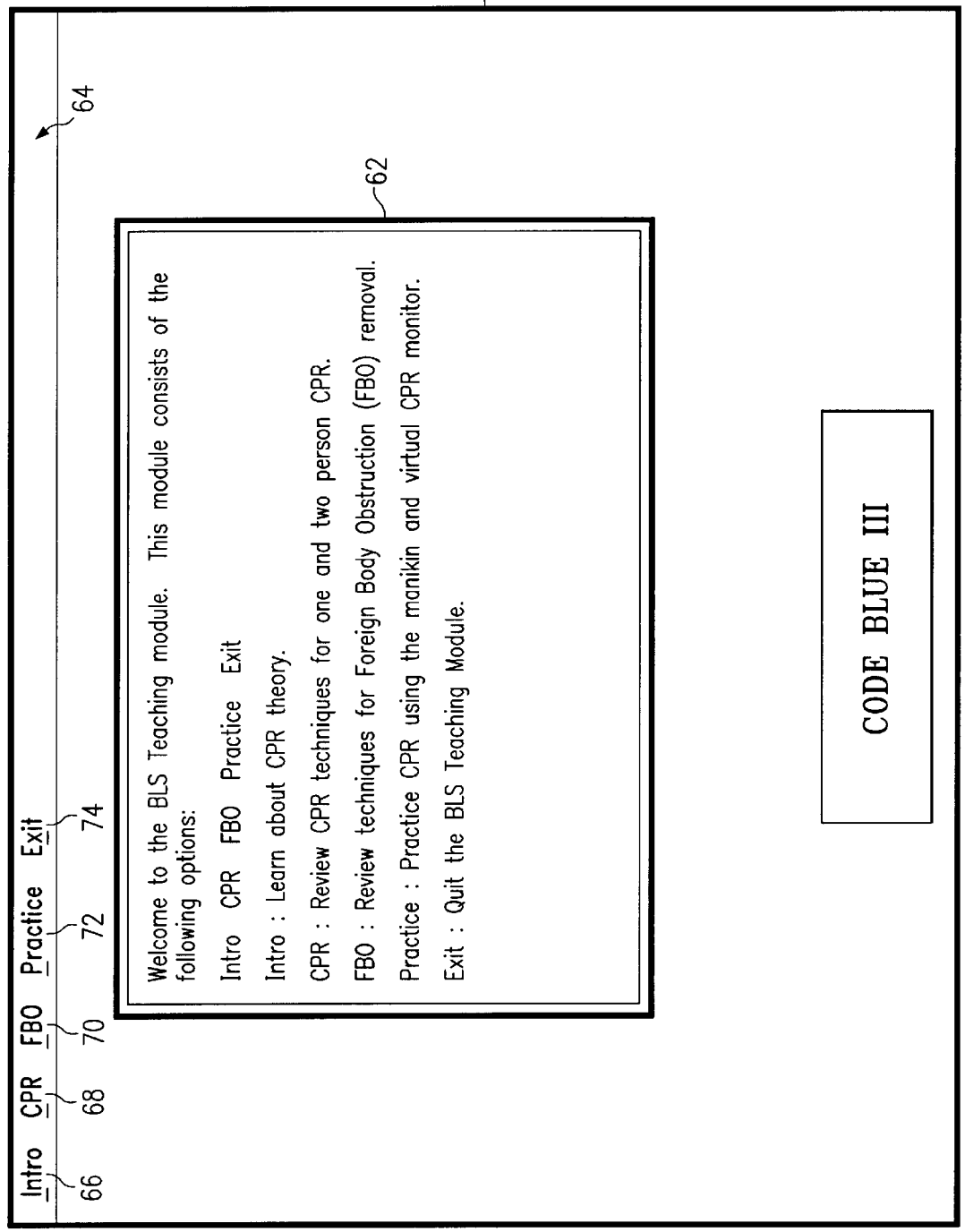

Referring to FIGS. 5 and 6, if one of the modules is selected by the user, such as by voice recognition or selection with a mouse of the computer 12, the program 14 displays a menu screen, listing information categories specific to the topic of the selected module. For example, if the BLS module 54a is selected by a user, the program 14 displays an instruction screen 60, as shown in FIG. 3. The instruction screen 60 contains an information box 62, which contains information regarding a menu 64 of the Basic Life Support information items of module 54a. It is understood that an item, such as items 66–70 of the BLS module 54a, may be selected from the screen 60. It can be appreciated that each module 54a–p has its own instruction screen with a menu of specific informational items, as will be described.

Figure 7:
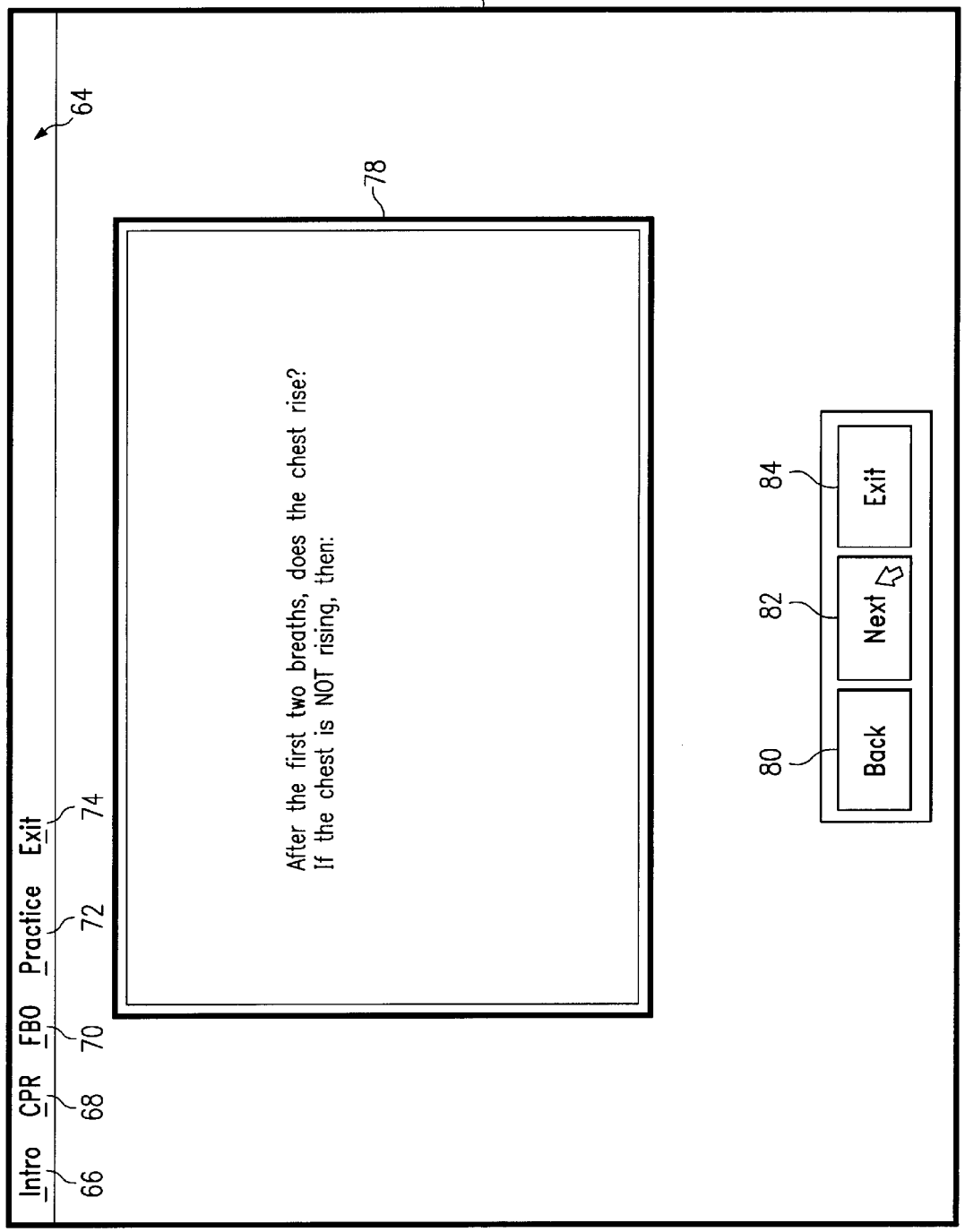

Referring to FIG. 7, selection of an item from a menu causes an information display screen 76 to be displayed. The screen 76 has an information box 78, which may contain text and/or illustrations topical to the selected menu item. It is understood that the information screen 76 is used as an example of any number of screens, and furthermore, such screens can be displayed in sequential order, or a series, for each item. A series of screens comprises a tutorial regarding patient treatment protocols for the selected menu item. Thus, the user can review information from a library of topics by selecting the appropriate module from the teaching box 48, and navigating through a series. Navigation in a series of screens by the user is attained by selection between three boxes: 80, 82, and 84, comprising "Back", "Next", and "Exit", respectively, with corresponding function among the screens. If no "Back" or "Next" function is possible, as respectively would be the case of the first and last screen of a series, the boxes 80 or 82 may be unselectable. The display screen 76 also has a menu, in this example the pull down menu 64 corresponding to the selected module 54a's menu items, and thus the user may switch between items within the selected module at any point during a series.

Figure 8:
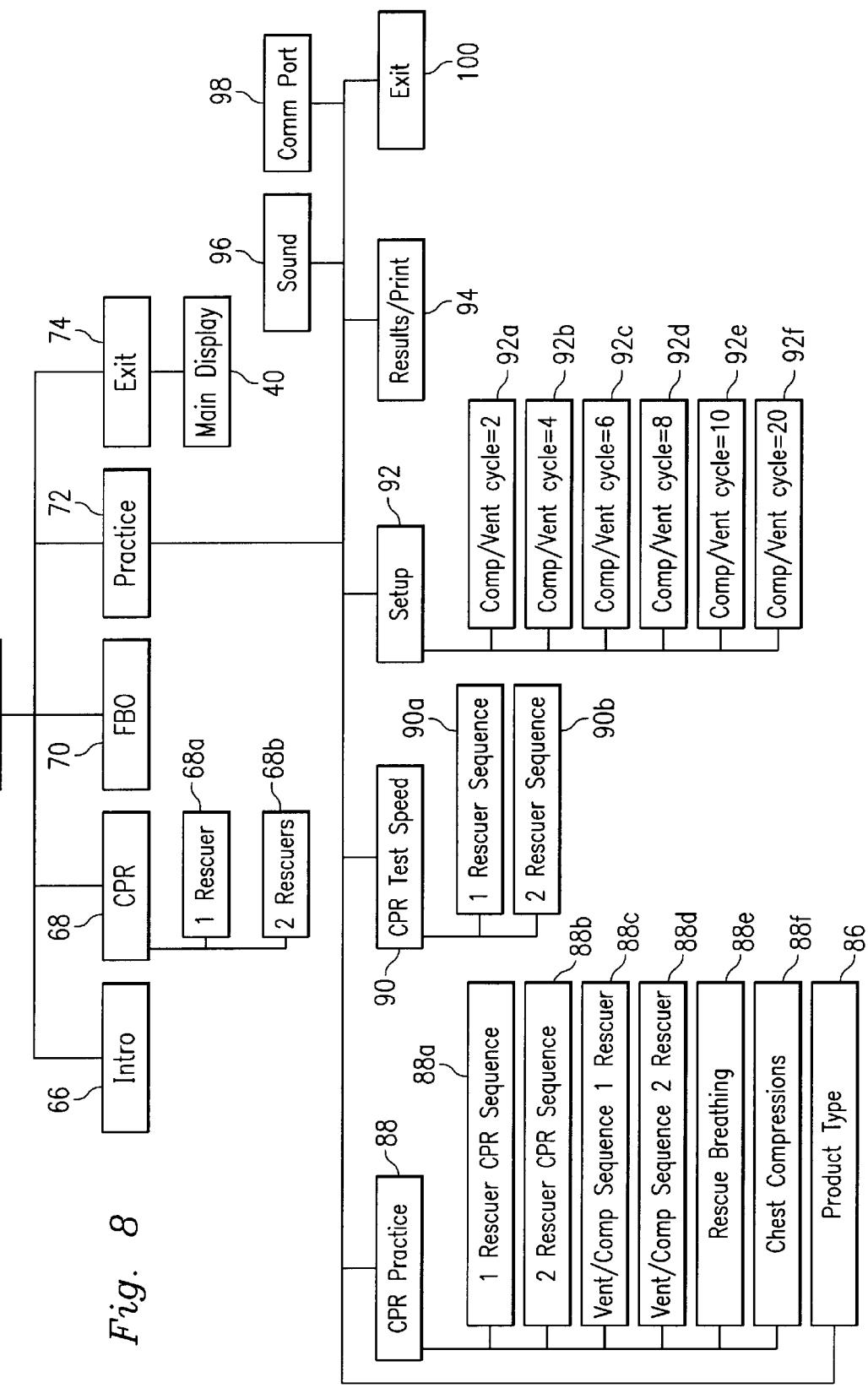

Referring to FIG. 8, the module 54a contains a group of items: an Intro item 66, a CPR item 68, an FBO item 70, a Practice item 72, and an Exit item 74 for returning to the display screen 40. Selection of an item begins a series of information display screens (FIG. 7), or an item may also be divided into sub-items before the screens appear, for example, if the CPR item 68 is selected, the user must select between a set of sub-items 68*a* and 68*b*, for one person and two person CPR, respectively, with appropriate information being supplied by the program 14. If the Practice item 72 is selected, the user may practice CPR on the simulator 32, and the program 14 compares the user's compression and ventilation, via the CIM and sensors 34, with accepted standards. The Practice 72 item contains a group of sub-items 86–100 displayed by the program 14, as shown. The Product Type sub-item 86 is provided for specifying the type of simulator 32. Upon selection of the CPR Practice sub-item 88, the user may select among a plurality of action sequences 88*a–f*, to receive training in CPR with one rescuer, CPR with two rescuers, CPR ventilation/compression techniques with one rescuer, or with two rescuers, rescue breathing, or chest compression, respectively. The CPR test speed sub-item 90 prompts the user to select between action sequences 90*a* or 90*b* for either one or two rescuers, respectively. The Setup sub-item 92 enables the user to specify that the action sequences comprise 2, 4, 6, 8, 10, or 20 compression/ventilation cycles, respectively 92*a–f*. The Results/Print sub-item 94 directs the program 14 to record the time and magnitude of the compression and ventilation activity executed by the user on the simulator 32. The Sound sub-item 96 comprises a group of choices (not depicted) for CIM beeps, realistic sounds, or no sound. The Comm port sub-item 98 allows selection between a group of choices (not depicted) for serial port 1 and serial port 2. Selection of the Exit sub-item 100 directs the program 14 to exit from the Practice item 72, and return to the module 54*a*.

Figure 9:
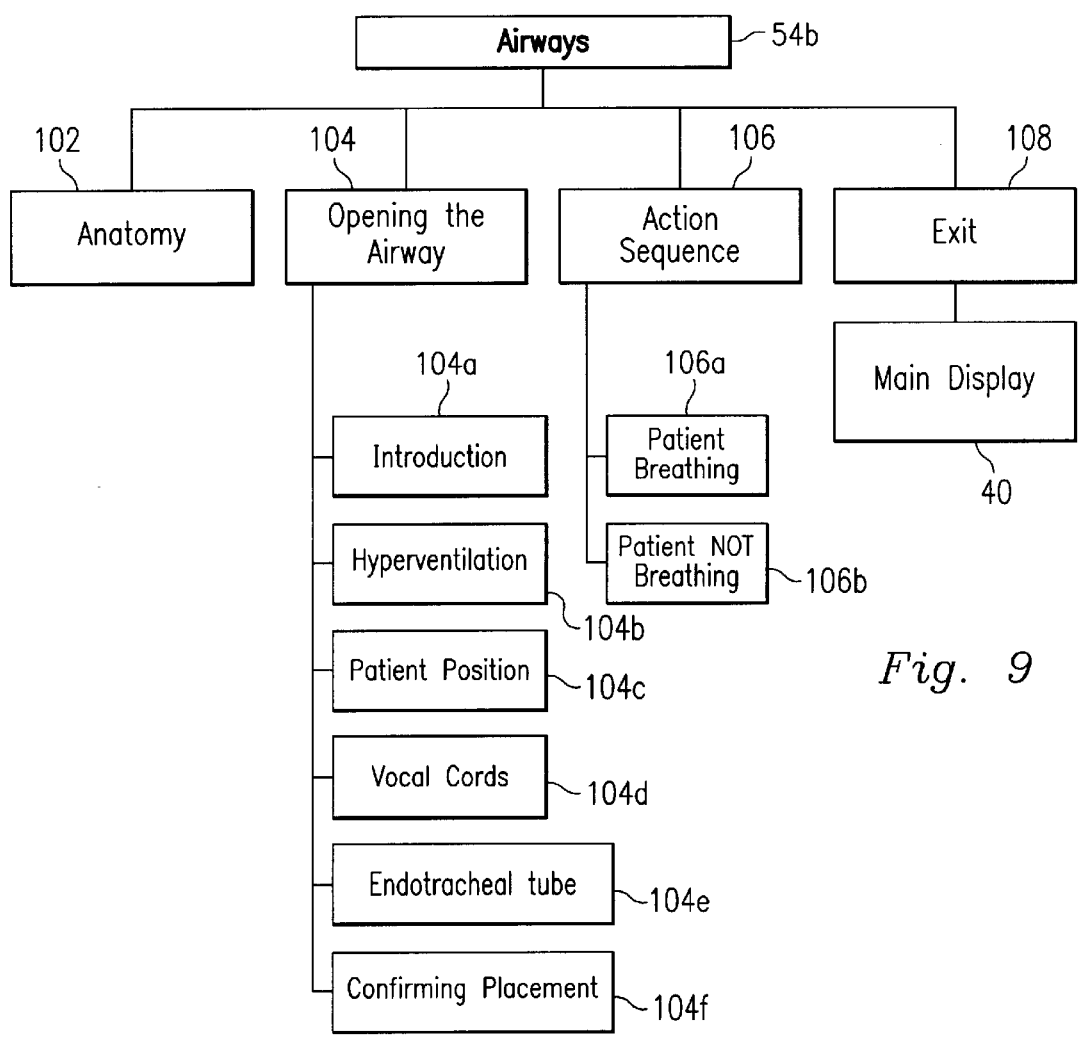
FIGS. 8–17 are schematic views of modules contained in the program of the present system.

Referring to FIG. 9, selection of the Airways module 54*b* (FIG. 5) directs execution of the program 14 to provide information items 102–108 directed to Anatomy, Opening the Airway, Action Sequence, and Exit, respectively. The Anatomy item 102 can be selected to display a series of informational screens pertaining to airway anatomy, including the upper torso, neck, head, mouth, and vocal cords. The Opening the Airway item 104 includes sub-items 104*a–f* regarding introduction, hyperventilation, patient position, vocal cords, endotracheal tube, and confirming placement, respectively. The Action Sequence item 106 includes sub-items 106*a* and 106*b* regarding situations where the patient is breathing, and where the patient is not breathing, respectively. The Exit item 108 is selected to exit the Airways module 54*b* and return to the display 40 (FIG. 5).

Figure 10:
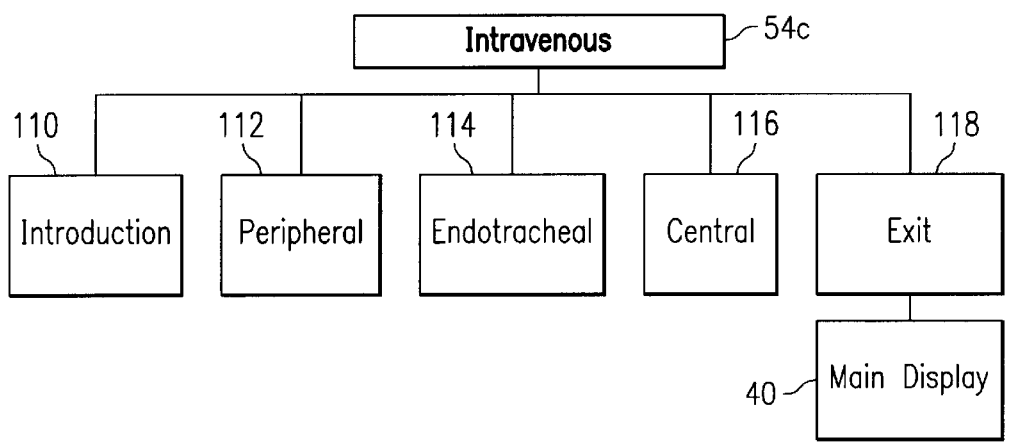

Referring to FIG. 10, selection of the Intravenous module 54*c* (FIG. 5) directs execution of the program 14 to a provide information items 110–118 directed to Introduction, Peripheral, Endotracheal, Central, and Exit, respectively. The Peripheral item 112 can be selected to display a series of informational screens pertaining to peripheral sites such as the antecubital vein, external jugular vein, saphenous vein, and intraosseous access. The Endotracheal item 114 can be selected to display a series of informational screens pertaining to the administration of ALE drugs in an ET tube. The Central item 116 can be selected to display a series of informational screens pertaining to central sites including the femoral vein, subclavian vein, and internal jugular vein. The Exit item 118 is selected to direct the program to exit the Intravenous module 54*c* and return to the display 40 (FIG. 5).

Figure 11:
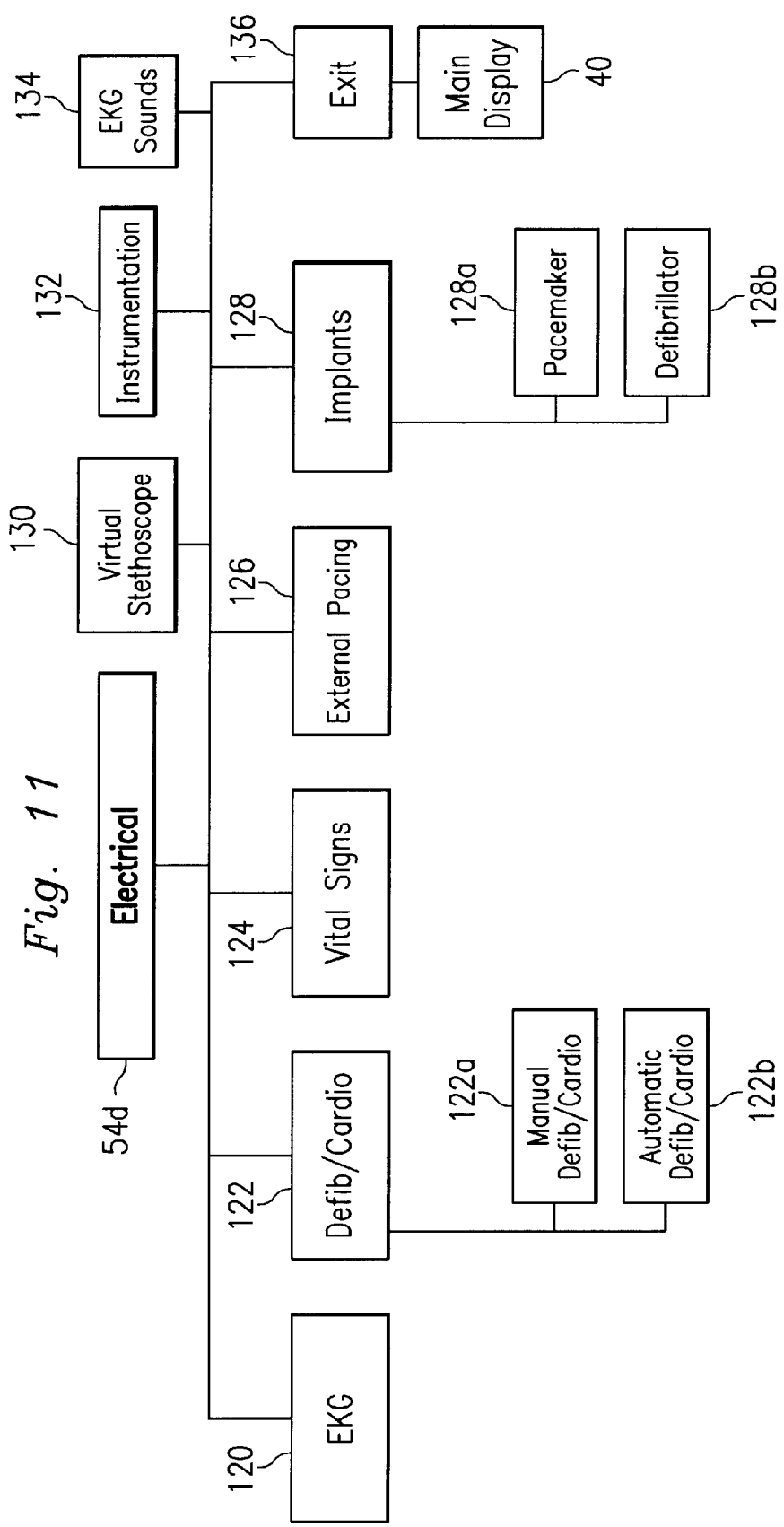

Referring to FIG. 11, selection of the Electrical module 54*d* (FIG. 5) directs execution of the program 14 to provide information items 120–136 for EKG, Defib/Cardio, Vital Signs, Ext. Pacing, Implants, Virtual Stethoscope, Instrumentation, EKG Sounds, and Exit, respectively. The EKG item 120 can be selected to display a series of informational screens pertaining to theory, use, and virtual EKG. The Defib/Cardio item 122 includes sub-items for manual defibrillation 122*a* and automatic defibrillation 122*b* ("AED"). The Vital signs item 124 can be selected to display a series of informational screens pertaining to blood pressure, heart rate, and oxygen saturation. The External Pacing item 126 can be selected to display a series of informational screens pertaining to theory, use, virtual defibrillation, and a virtual pacer. The Implants item 128 has sub-items for a pacemaker 128*a* and a defibrillator 128*b*. The Virtual stethoscope item 130 can be selected to display a series of informational screens pertaining to using the software-generated stethoscope of the program 14, which will be described in greater detail below, with respect to the virtual instruments tutor box 52. The Instrumentation item 132 has a set of choices (not depicted) for enabling, disabling, or checking the connections between the virtual instruments 30, the sensors 34, and the CIM 16. The EKG Sounds item 134 has set of choices (not depicted) for enabling or disabling the sounds. Exit item 136 is selected to direct the program 14 to exit from the Electrical module 54*d*, and return to the display 40 (FIG. 5).

Figure 12:
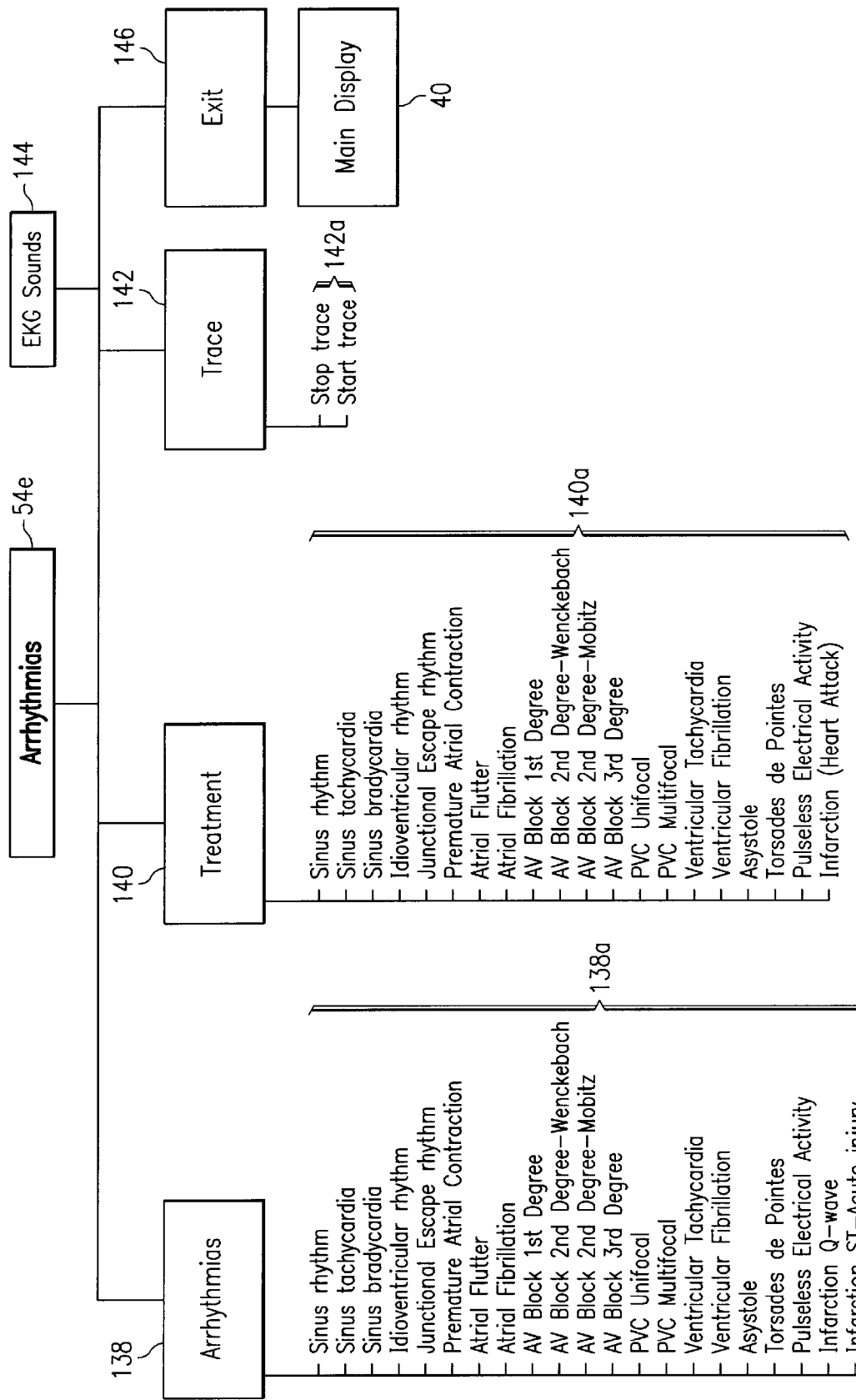

Referring to FIG. 12, selection of the Arrhythmias module 54*e* directs execution of the program 14 to a provide information regarding Arrhythmias, Treatment, Trace, and Exit, respectively items 138–146. The items 138 and 140 include a group of choices for information about a number of problems and treatments, respectively 138*a* and 140*a*. The Trace item 142 has controls for starting and stopping the trace, collectively 142*a*. The EKG Sounds item 144 has set of choices (not depicted) for enabling or disabling the sounds. Selection of the Exit item 146 directs the program 14 to exit from the Arrhythmias module 54*e*, and return to the display 40 (FIG. 5).

Figure 13:
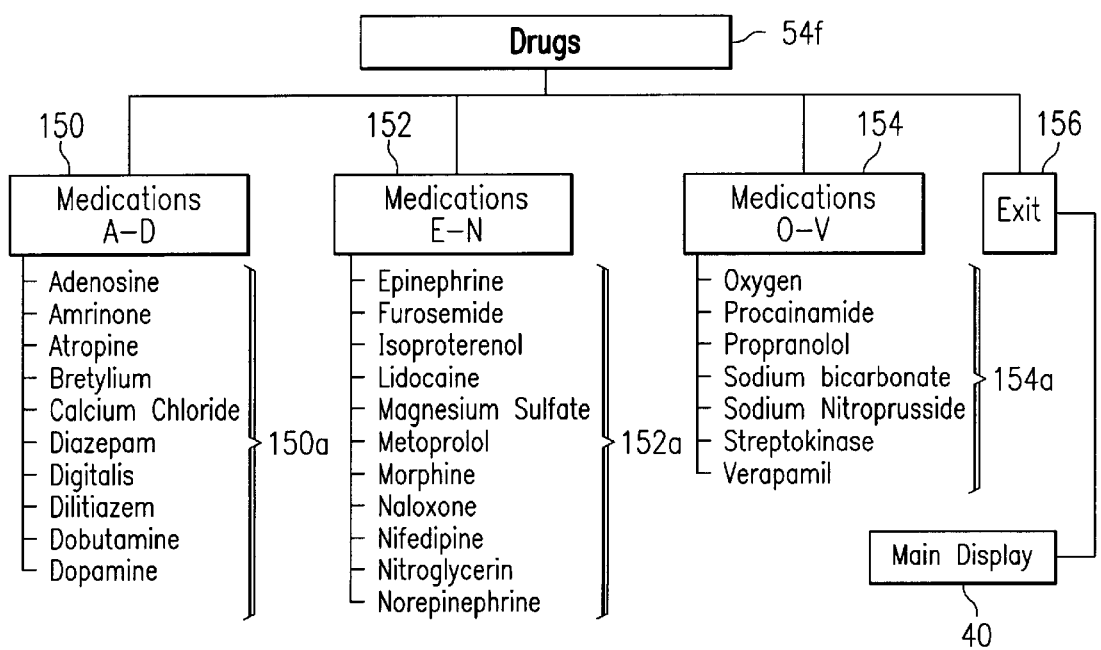

Referring to FIG. 13, selection of the Drugs module 54*f* directs execution of the program 14 to provide information regarding drugs, divided alphabetically into items 150–154, respectively Medications A–D, E–N, and O–V. These items include a group of choices 150*a*–154*a* for information including the dosage, indications, uses, actions, side effects, and precautions for the alphabetically grouped drugs. Selection of the Exit item 156 directs the program 14 to exit from the Drugs module 54*f*, and return to the display 40 (FIG. 5).

Figure 14:
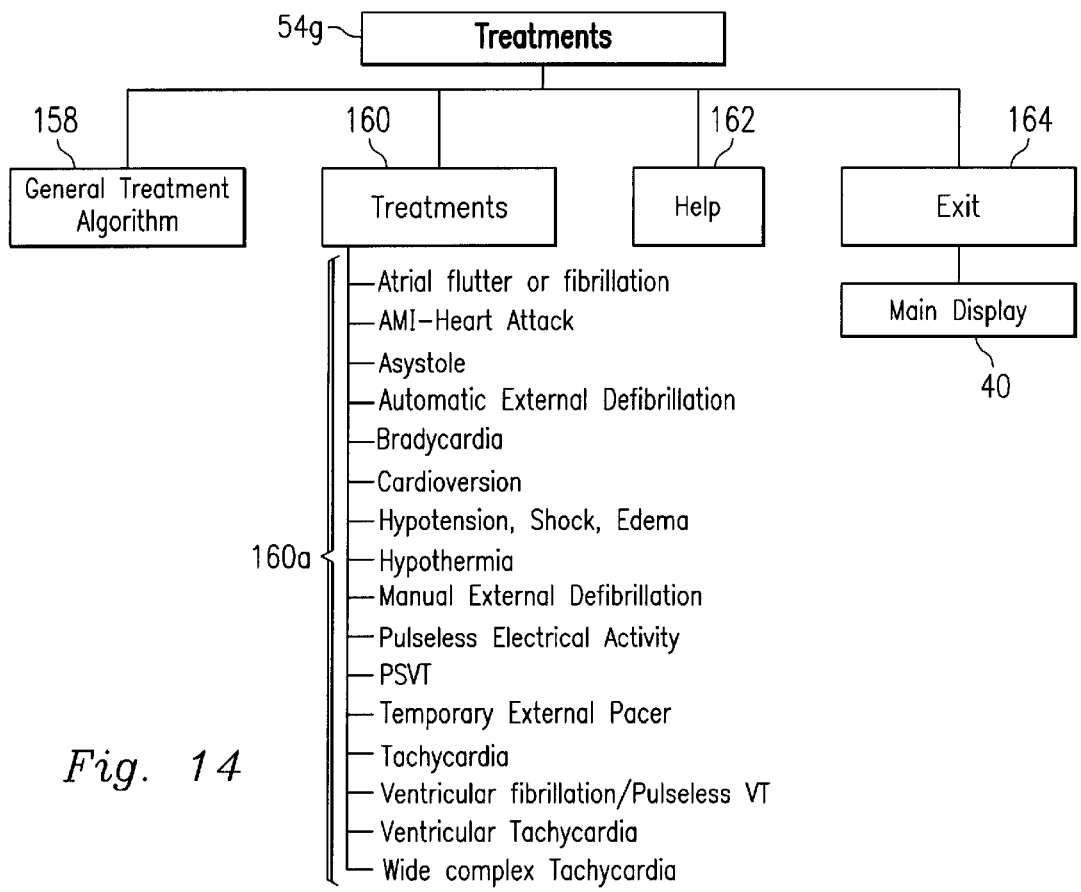

Referring to FIG. 14, selection of the Treatments module 54*g* directs execution of the program 14 to provide informational algorithms regarding treatment action sequences, including the items General Algorithm 158, Treatments 160, Help 162, and Exit 164. The General Algorithm 158 allows the user to work through a treatment scenario by answering questions as to a program-simulated patient's status. The Treatments item 160 includes a group of choices 160*a* to receive information on topics including atrial flutter, AMI heart attack, asystole, automatic external defibrillation, bradycardia, cardioversion, shock, hypothermia, manual external defibrillation, pulseless electrical activity, PSVT, temporary external pacer, tachycardia, ventricular fibrillation, ventricular tachycardia, and wide complex tachycardia. The Help item 162 provides information regarding using the Treatments module 54*g*. Selection of the Exit item 164 directs the program 14 to exit from the Treatments module 54*g*, and return to the display 40 (FIG. 5).

Referring back to FIG. 5, selection of a test module 54*h–j* from the test box 50 directs execution of the program 14 to provide a sequence to help test the user on patient care protocols, such as CPR and other responses to Code scenarios. The program 14 paces through the steps of a patient distress scenario, giving the user a predetermined time to respond or complete the task required, thus, the user is able to experience the pressure of a Code situation. For example, the program 14 may test the user by presenting choices from which the user must select in order to treat the patient, wherein the user must complete the correct choice before the sequence proceeds to the next event. The program 14 enables the user to enable, disable, or check the virtual instruments 30 and sensors 34 for connection to supply input to the CIM 16. If the virtual instruments are enabled, the user may implement patient care activity on the simulator 32 using the virtual instruments 30, with the results and quality of response being monitored by the program 14. Alternatively, the user may use software-simulated instruments generated by the program 14. The program 14 advances through the scenario until the patient recovers, and provides a running critique of the user's responses, with an explanation of each incorrect choice or action. Features of the test modules 54h–j include items that enable the user to specify that action sequences prescribed by the scenario comprise a predetermined number of compression/ventilation cycles, or to allow the user to record the time and magnitude of the compression and ventilation activity performed on the simulator 32, or to select among a group of choices for hearing realistic sounds.

Figure 15:
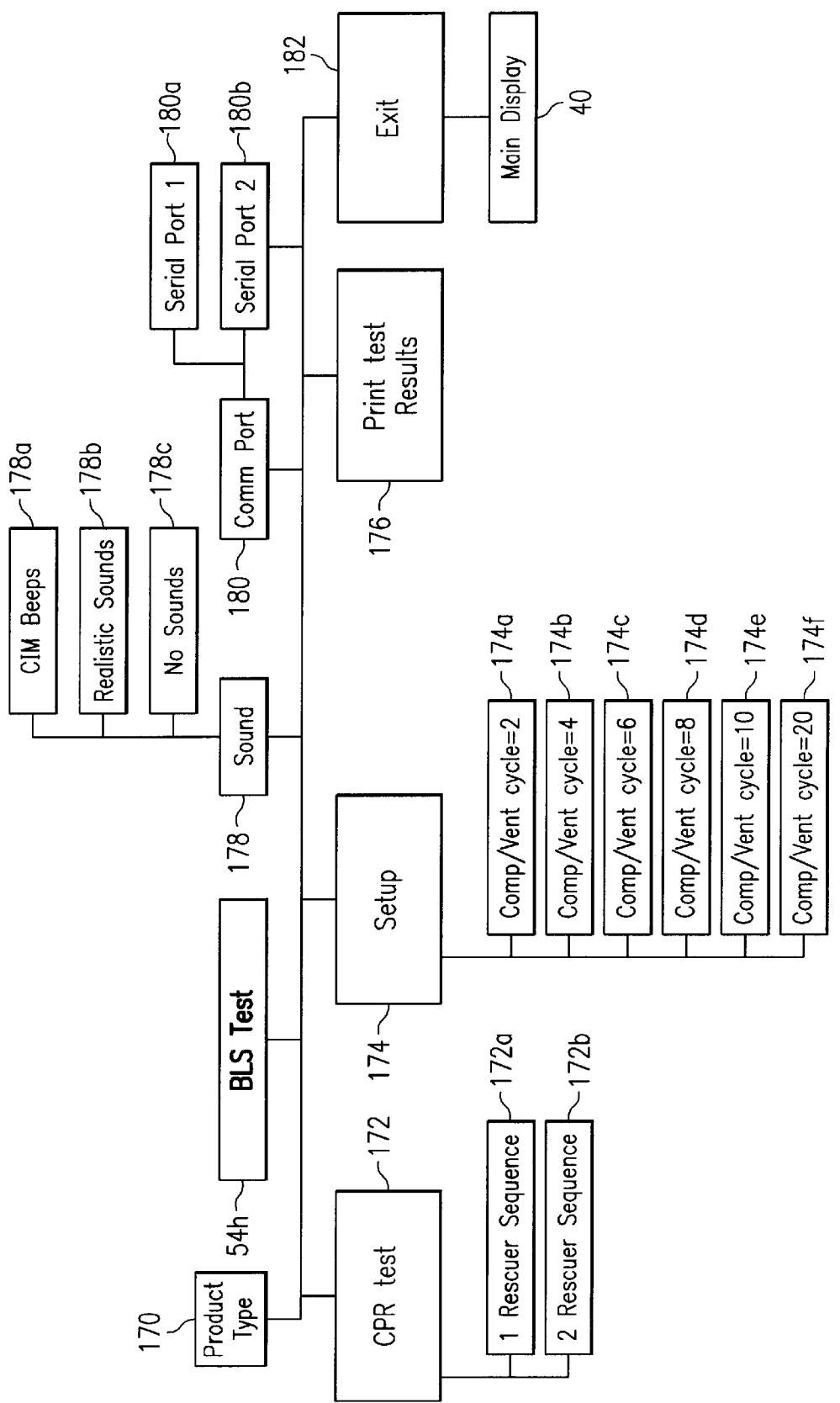

Referring to FIG. 15, selection of the BLS Test module 54h (FIG. 5) directs execution of the program 14 to provide items 170–182, respectively, Product type, CPR Test, Setup, Print, Sound, and Comm port, to help test the user on CPR techniques. The Product type item 170 is provided for specifying the type of simulator 32. Upon selection of the CPR test item 172, the user may select among a plurality of action sequences, to receive training in CPR with one rescuer 172a, or with two rescuers 172b. The Setup item 174 enables the user to specify that the action sequence comprises 2, 4, 6, 8, 10, or 20 compression/ventilation cycles, respectively 174a–f. The Print item 176 directs the program 14 to record the time and magnitude of the compression and ventilation activity executed by the user on the simulator 32. The Sound item 178 comprises a group of choices for CIM beeps, realistic sounds, or no sound, respectively 178a–c. The Comm port item 180 allows selection between a group of choices for serial port 1 and serial port 2, respectively 180a–b. Selection of the Exit item 182 directs the program 14 to exit from the BLS test module 54h, and return to the display 40 (FIG. 5).

Figure 16:
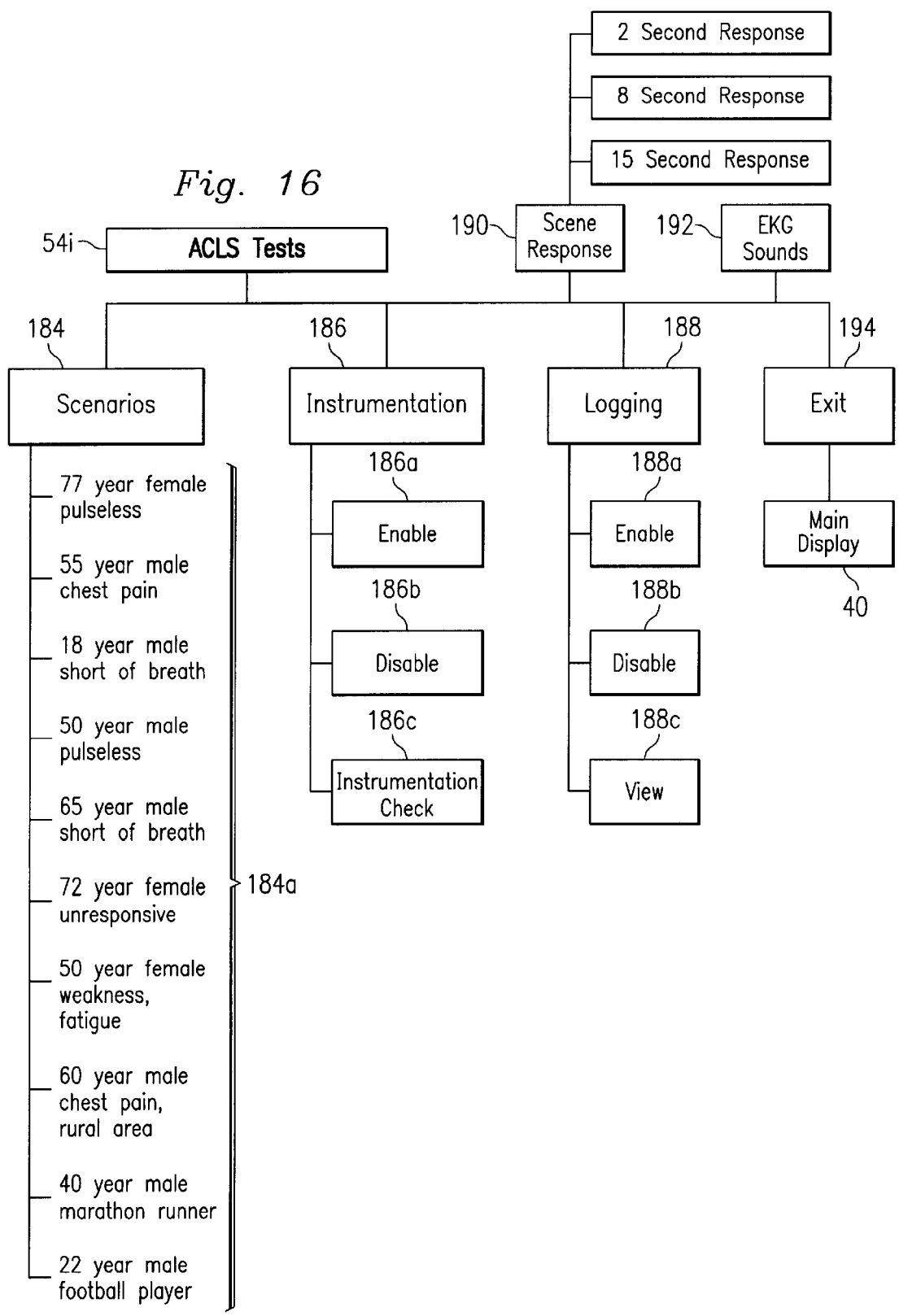

Referring to FIG. 16, selection of the ACLS Test module 54i allows the user to select among a plurality of items 184–194, for Scenarios, Instrumentation, Logging, Scene Response, EKG Sounds, and Exit, respectively. The Scenarios item 184 contains a group of action sequences 184a, comprising a pulseless 77 year old female, a 55 year old male with chest pain, an 18 year old male short of breath, a 50 year old pulseless male, a 65 year old male short of breath, a 72 year old unresponsive female, a 50 year old female with weakness and fatigue, a 60 year old male with chest pain in a rural area, a 40 year old male marathon runner, and a 22 year old football player. The user selects from the group 184a and then navigates a series of information screens while responding to queries as to the proper procedure for the selected action sequence. More specifically, the program 14 supplies details of the selected sequence, as well as a box (not depicted) showing the patient's EKG trace and vital signs. The Instrumentation item 186 enables the user to enable 186a, disable 186b, or check for connection 186c, the virtual instruments 30 and sensors 34 that supply input from the simulator 32 to the CIM 16. The user may use software-simulated instruments generated in the module 54i by the program 14, or, alternatively, if the instrumentation is enabled by selecting sub-item 186a, the user may implement patient care activity on the simulator 32, with the results and quality of response being monitored by the program 14. The Logging item 188 comprises sub-items 188a–c to enable, disable, or view a record of the time and magnitude of the compression and ventilation activity executed by the user on the simulator 32. The Scene Response item 190 has a group of choices 190a–c for selecting between a two, eight, or fifteen second scene response. The EKG Sounds item 192 has a group of choices (not depicted) for enabling or disabling the sounds. Selection of the Exit item 194 directs the program 14 to exit from the ACLS module 54i, and return to the display 40 (FIG. 5).

Testing may be defined by the program 14, as above, or by the user. For example, selection of the Codemaker Test module 54j (FIG. 5) allows one user, for example, an instructor, to create a scenario to test another user, for example, a student. The module 54j allows the instructor to define the testing scenario by entering a set of preliminary patient parameters regarding information such as sex, weight, and age, as well as patient indications, like shortness of breath, chest pain, mental awareness, and circulation. Benefits of this module include flexibility and the ability to detect mastery of the subject. An instructor-defined algorithm would presumably vary from well-known, structured algorithms, and thus avoid the problem of rote memorization of responses by the student.

Figure 17:
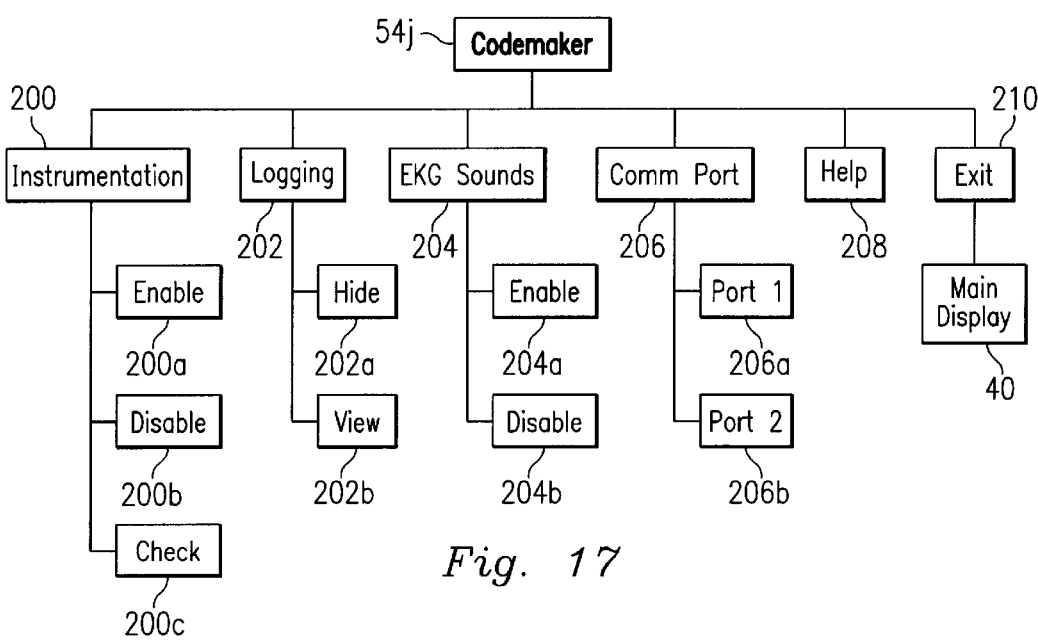

Referring to FIG. 17, the Codemaker test module 54j includes a plurality of items 200–210, for Instrumentation, Logging, EKG Sounds, Comm. Port, Help, and Exit, respectively. The Instrumentation item 200 enables the user, by further selecting from a group of choices 200a–c to enable or disable or check the virtual instruments 30 and sensors 34 that supply input from the simulator 32 to the CIM 16. The Logging item 202 comprises a group of choices 202a–b to hide or view a record of the time and magnitude of the compression and ventilation activity executed by the user on the simulator 32. The EKG Sounds item 204 has a group of choices 204a and 204b for enabling or disabling the sounds. The Comm port item 206 allows selection between a group of choices 206a and 206b for communication ports one and two, respectively. The Help item 208 provides direction for using the module 54j. Selection of the Exit item 210 directs the program 14 to exit from the Codemaker module 54j, and return to the display 40 (FIG. 5).

Use of the modules 54k–p of the virtual instruments tutor box 52 provides information about instruments commonly used in Code scenarios. In some instances, opportunities to practice using some of the virtual instruments 30 in patient care protocols with the simulator 32 are provided. Referring to FIG. 18, selection of the Sounds module 54k (FIG. 5) by the user causes the program 14 to display a series of screens, such as display 220. The display 220 includes a Sounds box 222 containing an On/Off button 222a, and a list of selectable heart and lung sounds, respectively 222b and 222c. Selection of a sound from the lists 222b–c will direct the program 14 to display a tutorial box 222d with information relating to the selected sound. The display is navigated by the Back, Next, and Exit buttons, respectively 80–84, and additionally contains a representation of a human torso 224, such that when a stethoscope icon 226, corresponding to the position of a mouse (not depicted) of the computer 12, is moved around the torso, the stethoscope icon glows when placed in the correct anatomical area for hearing the selected sound and the program 14 plays the sound. An Exit item 228 is provided for exiting the module 54k and returning to the display 40 (FIG. 5).

Referring to FIG. 19, selection of the Vital Signs module 54l (FIG. 5) causes the program 14 to display a series of screens, such as display 230. The display 230 includes a Vital signs monitor box 232 containing indicator boxes for systolic pressure, diastolic pressure, heart rate, and oxygen saturation, 232a–d, respectively. The display 230 is navigated by the Back, Next, and Exit buttons, respectively 80–84. A Sample Rhythms item 234 contains a group of selectable rhythms for the user to observe, such as a normal sinus rhythm, sinus bradycardia, idioventricular rhythm, ventricular tachycardia, and ventricular fibrillation. An Exit item 236 is provided for exiting the module 54l and returning to the display 40 (FIG. 5).

Referring to FIG. 20, selection of the Virtual EKG Monitor module 54m (FIG. 5) causes the program 14 to display a series of screens, such as display 240. The display 240 includes an Electrocardiograph box 242 for displaying the EKG sweep 242a, and having a heart rate indicator 242b and On/Off button 242c. The display 240 is navigated by the Back, Next, and Exit buttons, respectively 80–84. A Sample Rhythms item 244 contains a group of selectable rhythms for the user to observe, such as a normal sinus rhythm, sinus bradycardia, idioventricular rhythm, ventricular tachycardia, and ventricular fibrillation. An EKG Sounds item 246 allows the user to enable or disable the associated sounds. An Exit item 248 is provided for exiting the module 54m and returning to the display 40 (FIG. 5).

Referring to FIG. 21, selection of the Automatic Defibrillator module 54n (FIG. 5) causes the program 14 to display a series of screens, such as display 250. The display 250 includes a Control box 252 having an advisories box 252a, and On/Off, Analyze, and Shock buttons 252b–d. The display 250 also has an EKG box 254 having a sweep 254a, and On/Off button 254b. The display 250 is navigated by the Back, Next, and Exit buttons, respectively 80–84. A Sample Rhythms item 256 contains a group of selectable rhythms for the user to observe, such as a normal sinus rhythm, sinus bradycardia, idioventricular rhythm, ventricular tachycardia, and ventricular fibrillation. An EKG Sounds item 258 allows the user to enable or disable the associated sounds. An Exit item 259 is provided for exiting the module 54n and returning to the display 40 (FIG. 5).

Referring to FIG. 22, selection of the Manual Defibrillator module 54o (FIG. 5) causes the program 14 to display a series of screens, such as display 260. The display 260 includes a Control box 262, having an imbedded EKG sweep 262a, an advisories box 262b, buttons 262c–g, respectively On/Off, Energy Select, Charge, Shock, and Synchronize, as well as a heart rate display 262h, and a selected energy indicator 262i. The display 260 is navigated by the Back, Next, and Exit buttons, respectively 80–84. A Sample Rhythms item 264 contains a group of selectable rhythms for the user to observe, such as a normal sinus rhythm, sinus bradycardia, idioventricular rhythm, ventricular tachycardia, and ventricular fibrillation. An EKG Sounds item 266 allows the user to enable or disable the associated sounds. An Exit item 268 is provided for exiting the module 54o and returning to the display 40 (FIG. 5).

Figure 23:
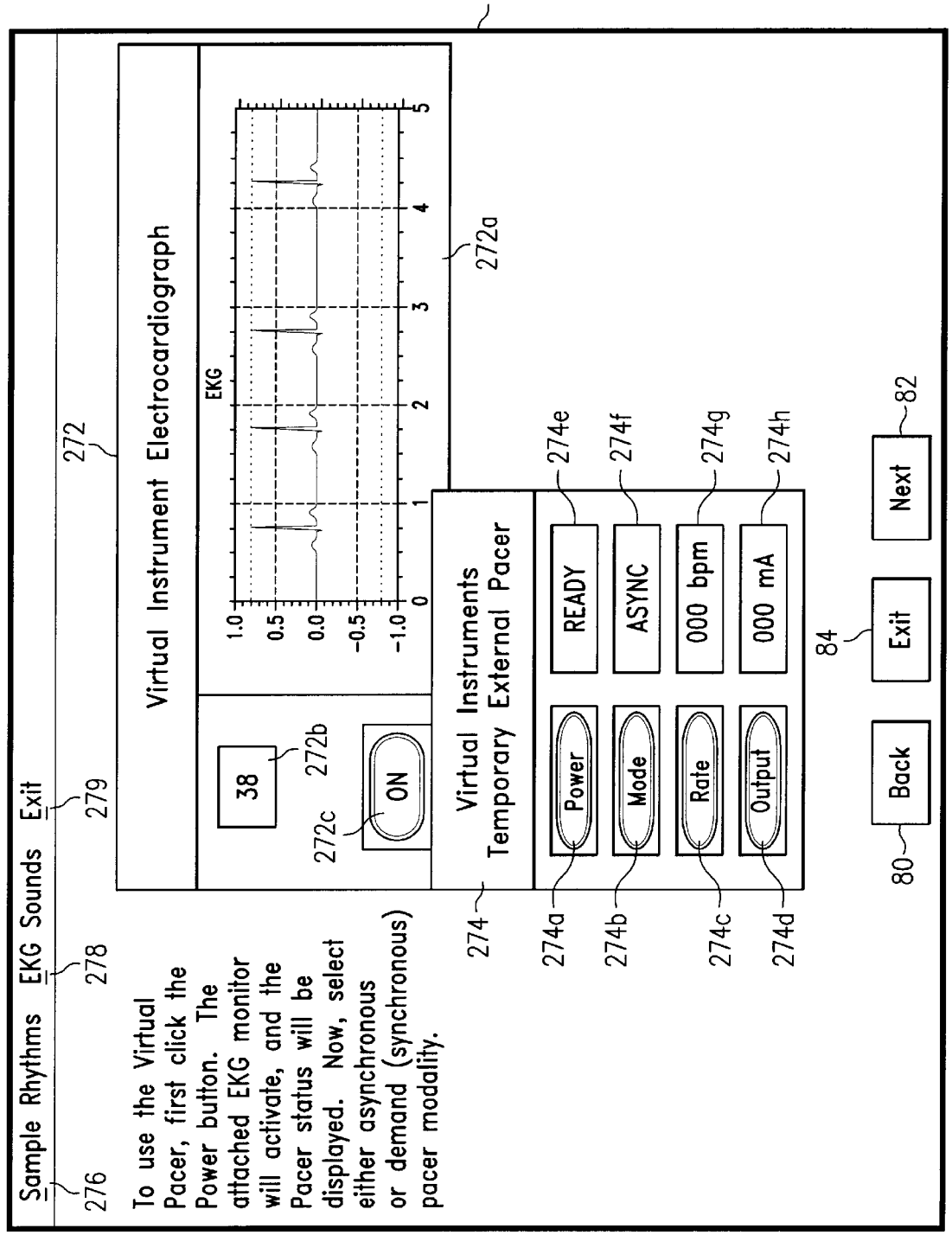

Referring to FIG. 23, selection of the Electrocardiograph module 54p (FIG. 5) causes the program 14 to display a series of screens, such as display 270. The display 270 includes an EKG box 272, having an associated EKG sweep 272a, a heart rate indicator 272b, and an On/Off button 272c. A Pacer box 274 is also provided by the program 14 and has buttons for power, mode, rate, and output, 274a–d, respectively, having associated status indicators 274e–h. The display 270 is navigated by the Back, Next, and Exit buttons, respectively 80–84. A Sample Rhythms item 276 contains a group of selectable rhythms for the user to observe, such as sinus bradycardia and idioventricular rhythm. An EKG Sounds item 278 allows the user to enable or disable the associated sounds. An Exit item 279 is provided for exiting the module 54p and returning to the display 40 (FIG. 5).

Although illustrative embodiments have been shown and described, a wide range of modification, change, and substitution is contemplated in the foregoing disclosure and in some instances, some features of the present embodiment may be employed without a corresponding use of the other features. It is understood that several variations may be made in the foregoing without departing from the scope of the embodiment. For example, the system 10 may be modified and adapted for training in pediatric advanced life support (PALS), gynecological treatment, spinal treatment, catheterization, head trauma, burn emergencies, and the like. Such modification may be implemented by simply modifying the program 14 and/or the virtual instruments 30 and sensors 34. Accordingly, it is appropriate that the appended claims be construed broadly and in a manner consistent with the scope of the embodiment.

What is claimed is:

1. A computerized education system with a physiological simulator for interactively teaching patient care to a user, the system comprising:
   a computer program for displaying a selection of selectable modules for providing different interactive training sessions;
   a virtual stethoscope for use with the simulator in performing patient care, and cooperating with corresponding sensors on the simulator, thus providing feedback to confirm proper use of the virtual stethoscope on the simulator; and
   an interface module for interfacing the sensors with the computer program, the module comprising a processor for receiving signals from the sensors and converting the signals to provide feedback.

2. The system of claim 1 wherein the feedback is provided as an audible presentation of body sounds.

3. The system of claim 2 wherein the body sounds are heart sounds.

4. The system of claim 2 wherein the body sounds are lung sounds.

5. The system of claim 2 wherein the body sounds are abdominal sounds.

6. The system of claim 2 wherein the stethoscope further comprises:
   (i) ear receptacles;
   (ii) a bell connected to the ear receptacles;
   (iii) an RF receiver disposed in the bell for receiving a unique set of RF signals from the sensor; and
   (iv) means for interpreting the identity of the sensor, and playing a corresponding body sound to the ear receptacles.

7. A computerized education system with a physiological simulator for interactively teaching patient care to a user, the system comprising:
   a computer program for displaying a selection of selectable modules for providing different interactive training sessions;

a stethoscope for use with at least one corresponding sensor on the simulator in performing patient care, the stethoscope comprising:
  (i) ear receptacles;
  (ii) a bell connected to the ear receptacles;
  (iii) an RF receiver disposed in the bell for receiving a unique set of RF signals from the sensor; and
  (iv) means for interpreting the identity of the sensor, and playing a corresponding body sound to the ear receptacles according to the computer program.

8. The system of claim 7 wherein the body sounds are heart sounds.

9. The system of claim 7 wherein the body sounds are lung sounds.

10. The system of claim 7 wherein the body sounds are abdominal sounds.

11. The system of claim 7 wherein the means is an interface module for interfacing the sensors with the computer program, the module comprising a processor for receiving signals from the sensors and means for converting the signals to provide the body sounds.

12. A computerized education system with a physiological simulator for interactively teaching patient care to a user, the system comprising:

a computer program for displaying a selection of selectable modules for providing different interactive training sessions;

a virtual stethoscope for use with the patient simulator in performing patient care activities, wherein the simulator and the virtual stethoscope are software-generated objects, the virtual stethoscope having movement corresponding with movement of a mouse of the computer; and means for providing feedback to the user regarding interaction between the virtual stethoscope and the simulator, the means comprising a glow which surrounds the virtual stethoscope when the virtual stethoscope is placed on the correct anatomical position of the simulator for hearing a predetermined body sound.

13. The system of claim 12 wherein the body sound is played by the program.

14. The system of claim 12 wherein the body sound is a heart sound.

15. The system of claim 12 wherein the body sound is a lung sound.

16. The system of claim 12 wherein the body sound is an abdominal sound.

* * * * *

UNITED STATES PATENT AND TRADEMARK OFFICE
CERTIFICATE OF CORRECTION

PATENT NO. : 6,443,735 B1
DATED : September 3, 2002
INVENTOR(S) : Eggert et al.

It is certified that error appears in the above-identified patent and that said Letters Patent is hereby corrected as shown below:

Title page,
Item [73], Assignee, should read as follows:
-- Gaumard Scientific Company, Inc., Miami, FL (US) --

Signed and Sealed this

Twenty-first Day of September, 2004

JON W. DUDAS
*Director of the United States Patent and Trademark Office*